(12) United States Patent
Danielyan et al.

(10) Patent No.: US 9,235,573 B2
(45) Date of Patent: *Jan. 12, 2016

(54) UNIVERSAL DIFFERENCE MEASURE

(71) Applicant: ABBYY InfoPoisk LLC, Moscow (RU)

(72) Inventors: Tatiana Danielyan, Moscow (RU); Konstantin Zuev, Moscow (RU)

(73) Assignee: ABBYY InfoPoisk LLC (RU)

( * ) Notice: Subject to any disclaimer, the term of this patent is extended or adjusted under 35 U.S.C. 154(b) by 413 days.

This patent is subject to a terminal disclaimer.

(21) Appl. No.: 13/672,001

(22) Filed: Nov. 8, 2012

(65) Prior Publication Data

US 2014/0129212 A1  May 8, 2014

Related U.S. Application Data

(63) Continuation-in-part of application No. 12/983,220, filed on Dec. 31, 2010, now Pat. No. 9,075,864, which is a continuation-in-part of application No. 11/548,214, filed on Oct. 10, 2006, now Pat. No.

(Continued)

(51) Int. Cl.
*G06F 17/27* (2006.01)
*G06F 17/30* (2006.01)
*G06F 17/28* (2006.01)

(52) U.S. Cl.
CPC .......... *G06F 17/3002* (2013.01); *G06F 17/277* (2013.01); *G06F 17/2755* (2013.01); *G06F 17/2785* (2013.01); *G06F 17/2872* (2013.01)

(58) Field of Classification Search
CPC .................... G06F 17/30598; G06F 17/30017; G06F 17/3002

USPC .............................. 704/9; 707/737, 738, 749
See application file for complete search history.

(56) References Cited

U.S. PATENT DOCUMENTS

| 4,706,212 A | 11/1987 | Toma |
| 5,068,789 A | 11/1991 | Van Vliembergen |
| 5,128,865 A | 7/1992 | Sadler |
| 5,146,405 A | 9/1992 | Church |
| 5,175,684 A | 12/1992 | Chong |

(Continued)

FOREIGN PATENT DOCUMENTS

| EP | 2400400 A1 | 12/2001 |
| EP | 1365329 B1 | 10/2009 |
| WO | 2011160204 A1 | 12/2011 |

OTHER PUBLICATIONS

Bolshakov, "Co-Ordinative Ellipsis in Russian Texts: Problems of Description and Restoration", Published in: Proceeding COLING '88 Proceedings of the 12th conference on Computational linguistics—vol. 1 doi>10.3115/991635.991649, 1988, 65-67.

(Continued)

*Primary Examiner* — Shaun Roberts
(74) *Attorney, Agent, or Firm* — LeighAnn Weiland; Veronica Weinstein

(57) ABSTRACT

Described herein are methods for finding substantially similar/different sources (files and documents), and estimating similarity or difference between given sources. Similarity and difference may be found across a variety of formats. Sources may be in one or more languages such that similarity and difference may be found across any number and types of languages. A variety of characteristics may be used to arrive at an overall measure of similarity or difference including determining or identifying syntactic roles, semantic roles and semantic classes in reference to sources.

27 Claims, 18 Drawing Sheets

Related U.S. Application Data 8,078,450, application No. 13/672,001, which is a continuation-in-part of application No. 13/535,638, filed on Jun. 28, 2012, and a continuation-in-part of application No. 13/464,447, filed on May 4, 2012, now Pat. No. 9,047,275, and a continuation-in-part of application No. 13/648,527, filed on Oct. 10, 2012, and a continuation-in-part of application No. 13/662,272, filed on Oct. 26, 2012.

(56) References Cited

U.S. PATENT DOCUMENTS

| | | |
|---|---|---|
| 5,268,839 A | 12/1993 | Kaji |
| 5,301,109 A | 4/1994 | Landauer et al. |
| 5,386,536 A | 1/1995 | Courts et al. |
| 5,386,556 A | 1/1995 | Hedin et al. |
| 5,418,717 A | 5/1995 | Su et al. |
| 5,426,583 A | 6/1995 | Uribe-Echebarria Diaz De Mendibi |
| 5,475,587 A | 12/1995 | Anick et al. |
| 5,477,451 A | 12/1995 | Brown et al. |
| 5,490,061 A | 2/1996 | Tolin et al. |
| 5,497,319 A | 3/1996 | Chong et al. |
| 5,510,981 A | 4/1996 | Berger et al. |
| 5,550,934 A | 8/1996 | Van Vliembergen et al. |
| 5,559,693 A | 9/1996 | Anick et al. |
| 5,669,007 A * | 9/1997 | Tateishi .................. 715/210 |
| 5,677,835 A | 10/1997 | Carbonnell et al. |
| 5,678,051 A | 10/1997 | Aoyama |
| 5,687,383 A | 11/1997 | Nakayama et al. |
| 5,696,980 A | 12/1997 | Brew |
| 5,715,468 A | 2/1998 | Budzinski |
| 5,721,938 A | 2/1998 | Stuckey |
| 5,724,593 A | 3/1998 | Hargrave et al. |
| 5,729,741 A * | 3/1998 | Liaguno et al. ................ 1/1 |
| 5,737,617 A | 4/1998 | Bernth et al. |
| 5,752,051 A | 5/1998 | Cohen |
| 5,768,603 A | 6/1998 | Brown et al. |
| 5,784,489 A | 7/1998 | Van Vliembergen et al. |
| 5,787,410 A | 7/1998 | McMahon |
| 5,794,050 A | 8/1998 | Dahlgren et al. |
| 5,794,177 A | 8/1998 | Carus et al. |
| 5,826,219 A | 10/1998 | Kutsumi |
| 5,826,220 A | 10/1998 | Takeda et al. |
| 5,848,385 A | 12/1998 | Poznanski et al. |
| 5,867,811 A | 2/1999 | O'Donoghue |
| 5,873,056 A | 2/1999 | Liddy et al. |
| 5,884,247 A | 3/1999 | Christy |
| 5,995,920 A | 11/1999 | Carbonell et al. |
| 6,006,221 A | 12/1999 | Liddy et al. |
| 6,055,528 A | 4/2000 | Evans |
| 6,076,051 A | 6/2000 | Messerly et al. |
| 6,081,774 A | 6/2000 | De Hita et al. |
| 6,161,083 A | 12/2000 | Franz et al. |
| 6,182,028 B1 | 1/2001 | Karaali et al. |
| 6,223,150 B1 | 4/2001 | Duan et al. |
| 6,233,544 B1 | 5/2001 | Alshawi |
| 6,233,546 B1 | 5/2001 | Datig |
| 6,243,669 B1 | 6/2001 | Horiguchi et al. |
| 6,243,670 B1 | 6/2001 | Bessho et al. |
| 6,243,689 B1 | 6/2001 | Norton |
| 6,243,723 B1 | 6/2001 | Ikeda et al. |
| 6,246,977 B1 | 6/2001 | Messerly et al. |
| 6,260,008 B1 | 7/2001 | Sanfilippo |
| 6,266,642 B1 | 7/2001 | Franz et al. |
| 6,275,789 B1 | 8/2001 | Moser et al. |
| 6,278,967 B1 | 8/2001 | Akers et al. |
| 6,282,507 B1 | 8/2001 | Horiguchi et al. |
| 6,285,978 B1 | 9/2001 | Bernth et al. |
| 6,330,530 B1 | 12/2001 | Horiguchi et al. |
| 6,349,276 B1 * | 2/2002 | McCarley .................. 704/8 |
| 6,356,864 B1 | 3/2002 | Foltz et al. |
| 6,356,865 B1 | 3/2002 | Franz et al. |
| 6,381,598 B1 | 4/2002 | Williamowski et al. |
| 6,393,389 B1 | 5/2002 | Chanod et al. |
| 6,442,524 B1 | 8/2002 | Ecker et al. |
| 6,463,404 B1 | 10/2002 | Appleby |
| 6,470,306 B1 | 10/2002 | Pringle et al. |
| 6,523,026 B1 * | 2/2003 | Gillis .................... 1/1 |
| 6,529,865 B1 | 3/2003 | Duan et al. |
| 6,601,026 B2 | 7/2003 | Appelt et al. |
| 6,604,101 B1 | 8/2003 | Chan et al. |
| 6,622,123 B1 | 9/2003 | Chanod et al. |
| 6,658,627 B1 | 12/2003 | Gallup et al. |
| 6,721,697 B1 | 4/2004 | Duan et al. |
| 6,751,606 B1 | 6/2004 | Fries et al. |
| 6,760,695 B1 | 7/2004 | Kuno et al. |
| 6,778,949 B2 | 8/2004 | Duan et al. |
| 6,871,174 B1 | 3/2005 | Dolan et al. |
| 6,871,199 B1 | 3/2005 | Binnig et al. |
| 6,901,399 B1 | 5/2005 | Corston et al. |
| 6,901,402 B1 | 5/2005 | Corston-Oliver et al. |
| 6,928,407 B2 * | 8/2005 | Ponceleon et al. ............ 704/253 |
| 6,928,448 B1 | 8/2005 | Franz et al. |
| 6,937,974 B1 | 8/2005 | D'Agostini |
| 6,941,325 B1 * | 9/2005 | Benitez et al. ............ 1/1 |
| 6,947,923 B2 | 9/2005 | Cha et al. |
| 6,965,857 B1 | 11/2005 | Decary |
| 6,983,240 B2 | 1/2006 | Ait-Mokhtar et al. |
| 6,986,104 B2 | 1/2006 | Green et al. |
| 7,013,264 B2 | 3/2006 | Dolan et al. |
| 7,020,601 B1 | 3/2006 | Hummel et al. |
| 7,027,974 B1 | 4/2006 | Busch et al. |
| 7,050,964 B2 | 5/2006 | Menzes et al. |
| 7,085,708 B2 | 8/2006 | Manson et al. |
| 7,132,445 B2 | 11/2006 | Taveras et al. |
| 7,146,358 B1 | 12/2006 | Gravano et al. |
| 7,167,824 B2 | 1/2007 | Kallulli |
| 7,184,948 B2 | 2/2007 | Chalabi et al. |
| 7,191,115 B2 | 3/2007 | Moore |
| 7,200,550 B2 | 4/2007 | Menezes et al. |
| 7,263,488 B2 | 8/2007 | Chu et al. |
| 7,269,594 B2 | 9/2007 | Corston-Oliver et al. |
| 7,283,951 B2 | 10/2007 | Marchisio et al. |
| 7,346,493 B2 | 3/2008 | Ringger et al. |
| 7,356,457 B2 | 4/2008 | Pinkham et al. |
| 7,398,201 B2 | 7/2008 | Marchisio et al. |
| 7,403,938 B2 | 7/2008 | Harrison et al. |
| 7,409,404 B2 | 8/2008 | Gates |
| 7,444,348 B2 | 10/2008 | Fries et al. |
| 7,461,056 B2 | 12/2008 | Cao et al. |
| 7,466,334 B1 * | 12/2008 | Baba .................... 348/14.06 |
| 7,475,015 B2 | 1/2009 | Epstein et al. |
| 7,619,656 B2 | 11/2009 | Ben-Ezra et al. |
| 7,672,830 B2 | 3/2010 | Goutte et al. |
| 7,672,831 B2 | 3/2010 | Todhunter et al. |
| 7,739,102 B2 | 6/2010 | Bender |
| 7,917,497 B2 | 3/2011 | Harrison et al. |
| 8,078,450 B2 | 12/2011 | Anisimovich et al. |
| 8,145,473 B2 | 3/2012 | Anisimovich et al. |
| 8,214,199 B2 | 7/2012 | Anismovich et al. |
| 8,229,730 B2 | 7/2012 | Van Den Berg et al. |
| 8,229,944 B2 | 7/2012 | Latzina et al. |
| 8,260,049 B2 * | 9/2012 | Deryagin et al. ............ 382/173 |
| 8,266,077 B2 | 9/2012 | Handley |
| 8,271,453 B1 | 9/2012 | Pasca et al. |
| 8,285,728 B1 | 10/2012 | Rubin |
| 8,300,949 B2 | 10/2012 | Xu |
| 8,301,633 B2 | 10/2012 | Cheslow |
| 8,402,036 B2 | 3/2013 | Blair-Goldensohn et al. |
| 8,533,188 B2 | 9/2013 | Yan et al. |
| 8,548,951 B2 | 10/2013 | Solmer et al. |
| 8,554,558 B2 | 10/2013 | McCarley et al. |
| 8,577,907 B1 | 11/2013 | Singhal et al. |
| 8,856,096 B2 * | 10/2014 | Marchisio et al. ............ 707/706 |
| 8,856,163 B2 | 10/2014 | Tong et al. |
| 2001/0014902 A1 | 8/2001 | Hu et al. |
| 2001/0029442 A1 | 10/2001 | Shiotsu et al. |
| 2001/0029455 A1 | 10/2001 | Chin et al. |
| 2002/0040292 A1 | 4/2002 | Marcu |
| 2003/0101164 A1 * | 5/2003 | Pic et al. .................... 707/1 |
| 2003/0101182 A1 | 5/2003 | Govrin et al. |
| 2003/0145285 A1 | 7/2003 | Miyahira et al. |

(56) References Cited

U.S. PATENT DOCUMENTS

| | | | |
|---|---|---|---|
| 2003/0158723 A1 | 8/2003 | Masuichi et al. | |
| 2003/0176999 A1 | 9/2003 | Calcagno et al. | |
| 2003/0182102 A1 | 9/2003 | Corston-Oliver et al. | |
| 2003/0204392 A1 | 10/2003 | Finnigan et al. | |
| 2004/0034520 A1 | 2/2004 | Langkilde-Geary et al. | |
| 2004/0064438 A1 | 4/2004 | Kostoff | |
| 2004/0098247 A1 | 5/2004 | Moore | |
| 2004/0122656 A1 | 6/2004 | Abir | |
| 2004/0172235 A1 | 9/2004 | Pinkham et al. | |
| 2004/0193401 A1 | 9/2004 | Ringger et al. | |
| 2004/0254781 A1 | 12/2004 | Appleby | |
| 2004/0261016 A1* | 12/2004 | Glass et al. | 715/512 |
| 2005/0010421 A1 | 1/2005 | Watanabe et al. | |
| 2005/0015240 A1 | 1/2005 | Appleby | |
| 2005/0080613 A1 | 4/2005 | Colledge et al. | |
| 2005/0086047 A1 | 4/2005 | Uchimoto et al. | |
| 2005/0137853 A1 | 6/2005 | Appleby et al. | |
| 2005/0155017 A1 | 7/2005 | Berstis et al. | |
| 2005/0171757 A1 | 8/2005 | Appleby | |
| 2005/0209844 A1 | 9/2005 | Wu et al. | |
| 2005/0240392 A1 | 10/2005 | Munro, Jr. et al. | |
| 2006/0004563 A1 | 1/2006 | Campbell et al. | |
| 2006/0004653 A1 | 1/2006 | Strongin | |
| 2006/0080079 A1 | 4/2006 | Yamabana | |
| 2006/0095250 A1 | 5/2006 | Chen et al. | |
| 2006/0217964 A1 | 9/2006 | Kamatani et al. | |
| 2006/0224378 A1 | 10/2006 | Chino et al. | |
| 2006/0293876 A1 | 12/2006 | Kamatani et al. | |
| 2007/0010990 A1 | 1/2007 | Woo | |
| 2007/0016398 A1 | 1/2007 | Buchholz | |
| 2007/0083359 A1 | 4/2007 | Bender | |
| 2007/0083505 A1 | 4/2007 | Ferrari et al. | |
| 2007/0094006 A1* | 4/2007 | Todhunter et al. | 704/8 |
| 2007/0100601 A1 | 5/2007 | Kimura | |
| 2007/0203688 A1 | 8/2007 | Fuji et al. | |
| 2007/0250305 A1 | 10/2007 | Maxwell | |
| 2008/0086453 A1* | 4/2008 | Fabian | 707/3 |
| 2008/0133218 A1 | 6/2008 | Zhou et al. | |
| 2008/0228464 A1 | 9/2008 | Al-Onaizan et al. | |
| 2008/0319947 A1 | 12/2008 | Latzina et al. | |
| 2009/0063472 A1 | 3/2009 | Pell et al. | |
| 2009/0070094 A1 | 3/2009 | Best et al. | |
| 2009/0144608 A1* | 6/2009 | Oisel et al. | 715/230 |
| 2010/0082324 A1 | 4/2010 | Itagaki et al. | |
| 2011/0043652 A1* | 2/2011 | King et al. | 348/222.1 |
| 2011/0055188 A1 | 3/2011 | Gras | |
| 2011/0072021 A1 | 3/2011 | Lu et al. | |
| 2011/0258181 A1* | 10/2011 | Brdiczka et al. | 707/723 |
| 2011/0301941 A1 | 12/2011 | De Vocht | |
| 2012/0023104 A1 | 1/2012 | Johnson et al. | |
| 2012/0030226 A1 | 2/2012 | Holt et al. | |
| 2012/0131060 A1 | 5/2012 | Heidasch et al. | |
| 2012/0197628 A1 | 8/2012 | Best et al. | |
| 2012/0197885 A1 | 8/2012 | Patterson | |
| 2012/0203777 A1 | 8/2012 | Laroco, Jr. et al. | |
| 2012/0221553 A1 | 8/2012 | Wittmer et al. | |
| 2012/0246153 A1 | 9/2012 | Pehle | |
| 2012/0296897 A1 | 11/2012 | Xin-Jing et al. | |
| 2012/0310627 A1 | 12/2012 | Qi et al. | |
| 2013/0013291 A1 | 1/2013 | Bullock et al. | |
| 2013/0054589 A1 | 2/2013 | Cheslow | |
| 2013/0091113 A1 | 4/2013 | Gras | |
| 2013/0138696 A1 | 5/2013 | Turdakov et al. | |
| 2013/0144592 A1 | 6/2013 | Och et al. | |
| 2013/0144594 A1 | 6/2013 | Bangalore et al. | |
| 2013/0185307 A1 | 7/2013 | El-Yaniv et al. | |
| 2013/0254209 A1 | 9/2013 | Kang et al. | |
| 2013/0282703 A1 | 10/2013 | Puterman-Sobe et al. | |
| 2013/0311487 A1 | 11/2013 | Moore et al. | |
| 2013/0318095 A1 | 11/2013 | Harold | |
| 2014/0012842 A1 | 1/2014 | Yan et al. | |

OTHER PUBLICATIONS

Hutchins, "Machine Translation: past, present, future", (Ellis Horwood Series in Computers and their Applications) Ellis Horwood: Chichester, 1986, 382 pp. ISBN 0-85312-788-3, $49.95 (hb).

Mitamura, et al., "An Efficient Interlingua Translation System for Multi-Lingual Document Production", http://citeseerx.ist.psu.edu/viewdoc/summary?doi=10.1.1.44.5702, Jul. 1, 1991.

* cited by examiner

- PART_OF_CREATIVE_WORK
- PRODUCTION_AS_TIME_ART
- RESULTS_OF_MAKING_DECISIONS
  - DECISION_AS_RESULT
  - DIAGNOSIS
  - ISSUE_PRECLUSION
  - SENTENCE_PRONOUNCED_BY_COURT
    - sentence
      - condemnation
    - CUSTODIAL_SENTENCE
    - DEATH_SENTENCE
    - JUDGEMENT_OF_ACQUITTAL
    - PRISON_SENTENCE
    - SENTENCE_OF_IMPRISONMENT
    - SUSPENDED_SENTENCE
    - VERDICT
  - SOLUTION_AS_RESULT
  - VOTE_AS_COLLECTIVE_OPINION
- RESULTS_OF_SPEECH_MENTAL_ACTIVITY
- MONEY
- MULTIMEDIA
- VIRTUAL_OBJECT
- VISUAL_REPRESENTATION
- MENTAL_OBJECT
- ORGANIZATION
- PART_OR_PORTION_OF_ENTITY
- PHYSICAL_OBJECT
- SUBSTANCE
- OBJECTS_BY_FORM_OF_MANIFESTATION
- SPACE_AND_SPATIAL_OBJECTS
- TIME
- ENTITY_OR_SITUATION_PRONOUN
- SITUATIONAL_AND_ATTRIBUTIVE_CLASSES

FIG. 5D

UNIVERSAL DIFFERENCE MEASURE

CROSS-REFERENCE TO RELATED APPLICATIONS

For purposes of the USPTO extra-statutory requirements, the present application constitutes a continuation-in-part of U.S. patent application Ser. No. 12/983,220, filed on 31 Dec. 2010, which is a continuation-in-part of U.S. Ser. No. 11/548, 214, filed on 10 Oct. 2006 (now U.S. Pat. No. 8,078,450), which is currently co-pending, or is an application of which a currently co-pending application is entitled to the benefit of the filing date. Also, this application is a continuation-in-part of U.S. patent application Ser. No. 13/535,638, filed on 28 Jun. 2012, and a continuation-in-part of U.S. patent application Ser. No. 13/464,447, filed on 4 May 2012.

This application is also a continuation-in-part of U.S. patent application Ser. No. 13/648,527, filed 10 October. This application is also a continuation-in-part of U.S. patent application Ser. No. 13/662,272, filed 26 Oct. 2012, and which is preliminarily titled: "Universal Document Similarity." This application is also a continuation-in-part of U.S. patent application Ser. No. 13/672,064, filed concurrently herewith, and which is preliminarily titled: "Similar Document Search."

The United States Patent Office (USPTO) has published a notice effectively stating that the USPTO's computer programs require that patent applicants reference both a serial number and indicate whether an application is a continuation or continuation-in-part. See Stephen G. Kunin, Benefit of Prior-Filed Application, USPTO Official Gazette 18 Mar. 2003. The Applicant has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but points out that the designations are not to be construed as commentary or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

BACKGROUND OF THE INVENTION

1. Field

Implementations of the present invention relate to natural language processing. In particular, implementations relate to comparing documents, which could be written in one or more languages and which contain one or more types of information. Comparing documents may involve estimation, computation and visualization of measures of similarity between any number of documents or other types of electronic files.

2. Related Art

Many natural language processing tasks require comparing documents in order to find out how similar or different they are from each other, i.e., estimating or computing a measure of similarity or difference of the documents. First, text resources existing on the Internet or other sources usually include a lot of copies of the same document which can be presented in different forms and formats. So, a document similarity computation is usually an implicit but mandatory step of many document processing tasks. Document similarity computation usually involves statistics, machine learning, such as, for example, document classification, clustering and so on. In particular, document similarity/difference computation could be required in plagiarism detection which aims at detecting if or when a document has been plagiarized from another one. A straight-forward approach to do this task is to compute a similarity/difference measure between documents, which is usually based on lexical features, such as words and characters. If the mentioned similarity/difference measure is beyond a certain threshold, the documents are deemed similar and therefore, one document could have been plagiarized from another one. More sophisticated ways to do this task could include other similarity/difference measures and approaches—but the concept is the same.

A related task is duplicate and near-duplicate detection. While constructing linguistic corpora, it makes sense to get rid of duplicate and near-duplicate documents. In this task, as well as in the case of plagiarism detection, it is required to estimate how similar considered documents are. In this task, lexical-based representations and therefore, similarity/difference measures, are usually enough for adequate performance.

However, many challenges exist for determining similarity of documents. For example, computation of cross-language document similarity/difference is in increasing demand to detect cross-language plagiarism. In this situation, the above-mentioned similarity/difference should be able to adequately detect substantially similar documents in different languages. Too often, such detection fails. Besides performing this task, such similarity/difference measure also could be used to construct parallel and comparable corpora, to build or enrich machine translation systems.

Most of the existing document processing systems are able to deal with documents written in only one, or rarely, in a few particular, identifiable languages. Systems are generally not able to compare documents written in different languages because a workable similarity/difference between such documents cannot be computed.

Further, many systems are also limited to particular document formats, i.e., some systems cannot analyze some documents without first obtaining a reliable and accurate recognition of their text (such as in the case of PDF files which can require processing by optical character recognition). Moreover, each system usually deals only with one particular type of information or data contained in a document, i.e., only with text-based, audio-based or video-based information. However, many documents, sources or files about a particular topic (e.g., online news) include a variety of types of information and types of documents. For example, two news-oriented documents or sources may contain or reference the same video file but discuss the content of the video differently. In this case, a text-oriented system may conclude that the sources are not similar and may conclude that the video-oriented material is identical without being able to adequately process the nuances of such material.

Therefore, there is a substantial opportunity for new methods for more accurately estimating similarity/difference between documents, content, sources and files in different languages and in different formats.

SUMMARY

Embodiments and discussion are presented herein regarding methods for finding substantially similar sources, files or documents, and estimating similarity/difference between given sources, files and documents. Sources may be in a variety of formats, and similarity/difference may be found across a variety of formats. Sources may be in one or more languages. Similarity/difference may be found across any number or types of languages. A variety of characteristics may be used to arrive at an overall measure of similarity/difference including determining or identifying syntactic roles, semantic roles and semantic classes in reference to sources.

BRIEF DESCRIPTION OF THE DRAWINGS

While the appended claims set forth the features of the present invention with particularity, the invention, together with its objects and advantages, will be more readily appreciated from the following detailed description, taken in conjunction with the accompanying drawings.

FIGS. 5A-5D illustrate fragments of a semantic hierarchy.

DETAILED DESCRIPTION

Figure 1:
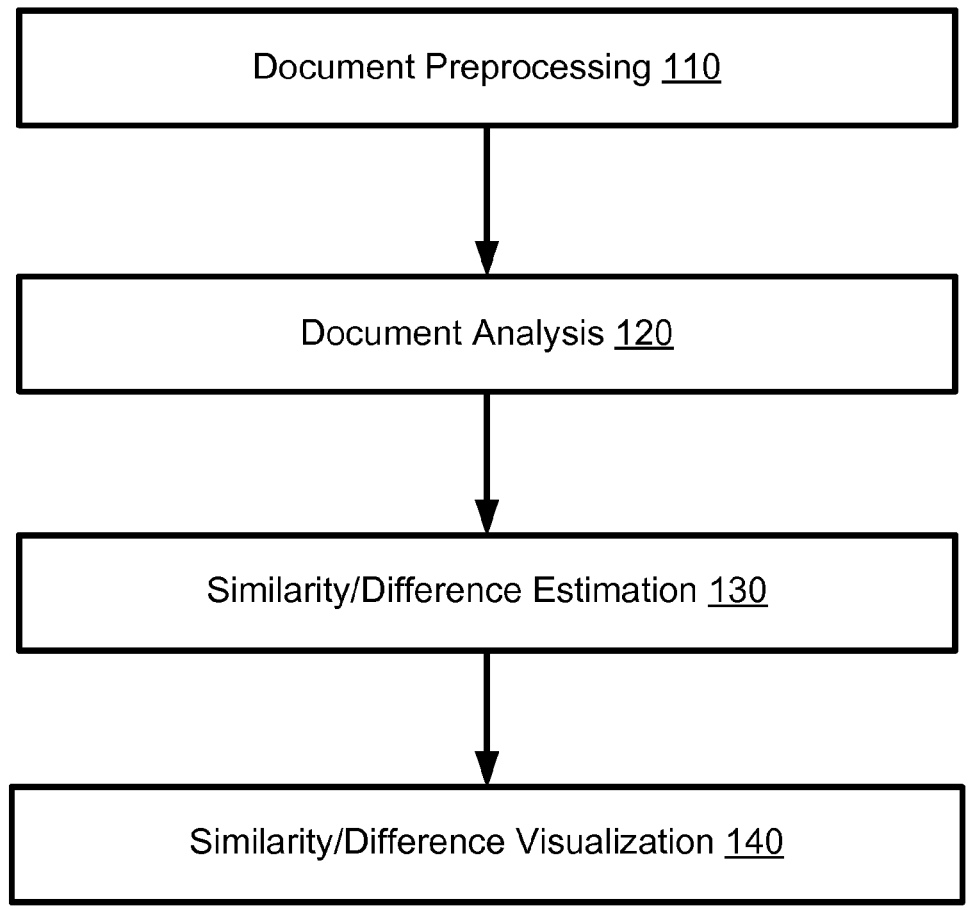
FIG. 1 is a flow diagram of a method of similarity/difference estimation according to one or more embodiments of the invention.

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an implementation" means that a particular feature, structure, or characteristic described in connection with the embodiment is included in at least one implementation of the invention. The appearances of the phrase "in one embodiment" or "in one implementation" in various places in the specification are not necessarily all referring to the same embodiment or implementation, nor are separate or alternative embodiments mutually exclusive of other embodiments. Moreover, various features are described which may be exhibited by some embodiments and not by others. Similarly, various requirements are described which may be requirements for some embodiments but not other embodiments.

Implementations of the present invention disclose techniques for comparing a number of documents that may contain different types of information including textual information presented in various languages. Comparing may include estimating, computing and visualizing similarity/difference between mentioned documents. Described herein is a method which estimates, computes and assists in visualizing similarity between documents. The method also compares different types of information. Moreover, the method includes techniques to deal with textual information, which can be compared based on substantially exhaustive syntactic and semantic analyses and language-independent semantic structures (LISS). Various lexical, grammatical, syntactical, pragmatic, semantic and other features may be identified in text and used to effectively solve said task. Implementations of the invention may or may not contain visualization of identified similarities or differences.

Implementations of the inventions allow a user to estimate similarity/difference between documents in different languages and those that include various types of information. Estimated document similarity may be represented by a value. Estimated document similarity alternatively, or additionally, may be represented with visualization techniques such as through a graphical user interface (GUI).

Document content can be divided into several partitions according to the type of information that the content includes. In particular, these partitions may be document segments containing only textual, graphical, audio, video or another type of information. The invention allows estimating the similarity/difference between different types of information presented in a document and may also provide graphical or other types of elements to assist visualization of found similarities/differences. Visualization may be implemented as e.g., highlighting, bolding, and underlining.

Document similarity and difference can be defined, for example, as follows:

$$\text{sim}(doc_1, \ldots, doc_n) = s(\text{infoType}_1(doc_1), \ldots, \text{infoType}_m(doc_1), \ldots \text{infoType}_1(doc_n), \ldots, \text{infoType}_m(doc_n))$$

$$\text{dif}(doc_1, \ldots, doc_n) = d(\text{infoType}_1(doc_1), \ldots, \text{infoType}_m(doc_1), \ldots \text{infoType}_1(doc_n), \ldots, \text{infoType}_m(doc_n))$$

where n is the number of documents to be compared, m is the number of different information types contained in documents, $doc_i$ is the i-th document, where i could be from 1 to n, $\text{infoType}_j(doc_i)$ is the part of $doc_i$, containing the j-th information type, s and d are functions of the said arguments.

Some documents may contain less information types than m.

For example, one document may be a video file and another document may be a text-based file or document. These two documents or files may be very similar, yet may be of different formats. The number of documents, files or sources in this case is 2, the number of information types is 2. And similarity, according to an exemplary implementation, is as follows:

$$sim(doc_1, doc_2) = s(infoType_1(doc_1), infoType_2(doc_1),$$
$$infoType_1(doc_2), infoType_2(doc_2))$$
$$= s(\text{video}(doc_1), \text{video}(doc_1), \text{text}(doc_2), \text{text}(doc_2))$$
$$= s(\text{video}(doc_1), \text{text}(doc_2))$$

In one embodiment, similarity between a video document and a text document may be computed with topic detection techniques. For example, a video document about cars may be considered or found to be substantially similar to a text about cars.

In one embodiment, optionally, comparison of documents includes identification of documents' logical structure (for example, presented in U.S. Pat. No. 8,260,049). Block structures may be identified before or after optical character recognition of the documents. In such case, further similarity estimation could be stopped if the identified structures are found to be sufficiently different. At first, most important blocks, such as titles or headers, may be compared. In one embodiment, block structures of the documents are compared with some weights, e.g. document header has higher weight and therefore influences final similarity/difference more than other blocks. In another embodiment, if found logical and/or block structures have tree-like view, the comparing may be executed step by step in a top-down approach, and it can be stopped if a sufficient amount of difference or a sufficient number of differences is discovered during some step.

In one embodiment of the invention, similarity can be described as:

$$sim(doc_1, doc_2) = f(docText_1, docText_2, docImages_1, docImages_2, docVideo_1, docVideo_2, docAudio_1, docAudio_2, \alpha, \beta, \gamma, \delta),$$

Where docText, docImages, docVideo, docAudio are textual, graphical, video and audio parts of document respectively; $\alpha$, $\beta$, $\gamma$, and $\delta$ are previously mentioned weights, and f is some function.

In one embodiment of the invention, similarity between two documents can be defined as follows:

$$sim(doc_1, doc_2) = \alpha \cdot sim_{text}(doc_1, doc_2) + \beta \cdot sim_{images}(doc_1, doc_2) + \gamma \cdot sim_{video}(doc_1, doc_2) + \delta \cdot sim_{audio}(doc_1, doc_2),$$

where $sim_{text}(doc_1, doc_2)$, $Sim_{images}(doc_1, doc_2)$, $sim_{video}(doc_1, doc_2)$, $Sim_{audio}(doc_1, doc_2)$ are similarities defined between only textual, graphical, video and audio contents of $doc_1$ and $doc_2$ respectively; and $\alpha$, $\beta$, $\gamma$, and $\delta$ are weights, i.e., real-valued numbers intuitively corresponding to the importance of each summand. In particular, if documents should be compared only on the basis of their textual content, a could be set to 1 and $\gamma$, $\gamma$, and $\delta$ to 0.

In one embodiment, the mentioned similarity measure may be a real-valued, usually non-negative, function of two or more arguments.

Sometimes documents look similar or even identical, even though they include differences. Some differences are not easy to detect or it may take a long time for a person to make a comparison to find out that the documents in question are not identical. Such differences include, for example, using letters from another alphabet which have similar spelling, "masking" spaces with characters colored with the color or the background and thus are not visible, inserting additional spaces, presenting some of the text as an image, etc. In this case, an implementation of the invention could be employed to determine a measure of document similarity or difference.

The present invention allows computing similarity between sources, files, and/or documents in different languages. A naïve way to compare documents with information in different languages is to apply machine translation algorithms to one or more of the sources, which propagate errors due to the imperfect nature of translation. In the current invention, machine translation techniques are not required to be applied to sources. Textual parts of sources, files or documents could be first converted into language-independent semantic structures (LISS). The same could be applied to transcripts of audio and video parts of documents.

Electronic documents or files can appear in different forms, i.e., some of them can be represented as raw text, while other documents or files may be in the portable document format (PDF), which in turn is generally a transformation of a document in another format. In the case of some formats, for example, a PDF file, in one embodiment of the present invention, document comparison is preceded by optical character recognition (OCR) of one or more of the documents. In one embodiment, comparison is preceded by producing transcripts of audio information included in the sources, files or documents.

FIG. 1 is a flow diagram of a method of similarity/difference estimation according to one or more embodiments of the invention. First, each document is preprocessed (110). During this step 110, the logical and block structure of each document may be determined, types of blocks are identified, text blocks of the document may be recognized with methods associated with OCR. Preprocessing may be followed by an analysis 120, e.g., exhaustive syntactic and semantic analyses of text included in the documents. Next, estimating a measure of similarity and/or difference between documents is performed at step 130. Similarity and/or difference may be represented as real-valued functions of one or more arguments. The arguments may include, but are not limited to, content of documents of various information types including results of said preprocessing step 110. Finally, at step 140 one or more various visualizations may be made illustrating similarities and/or differences. Visualization may be done by showing one or more documents and highlighting, underlining, emphasizing or indicating similar parts and different parts.

Additionally, appropriate methods of comparing are applied for each type of block. For example, appropriate methods to estimate semantic or lexical similarity between texts may be applied to compare document headers, while pictures may be converted, for example, into their RGB representations and a measure of similarity between these representations may be estimated.

For each corresponding text block, the system may employ automatic syntactic and semantic analyses to determine and to extract lexical, grammatical, syntactical, pragmatic, semantic and other features for further use in processing texts. These features are extracted during the process of a substantially exhaustive analysis of each sentence and constructing language-independent semantic structures (LISS), generally one for each sentence processed. Such preliminary exhaustive analysis precedes similarity estimation in one embodiment of the present invention. The system analyzes sentences using linguistic descriptions of a given natural language to reflect real complexities of the natural language, rather than simplified or artificial descriptions. The system functions are based on the principle of integral and purpose-driven recognition, where hypotheses about the syntactic structure of a part of a sentence are verified within the hypotheses about the syntactic structure of the whole sentence. Such procedure avoids analyzing numerous parsing of anomalous variants. Then, syntactic and semantic information about each sentence is extracted and the results are parsed, and lexical choices including results are obtained when resolving ambiguities. Information and results may be indexed and stored.

Figure 1A:
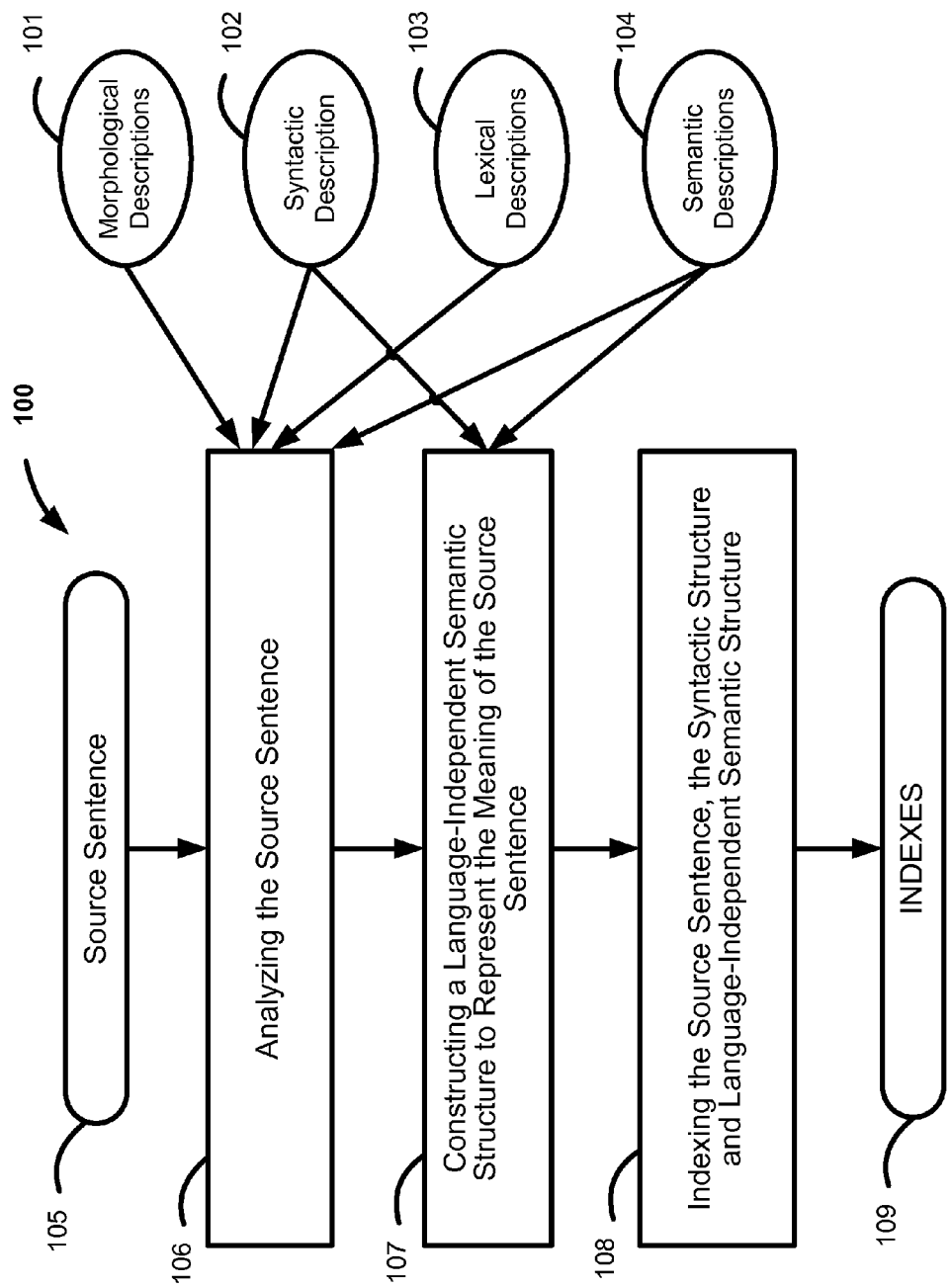
FIG. 1A is a flow diagram of a method according to one or more embodiments of the invention.

FIG. 1A is a flow diagram 100 of a method of a substantially exhaustive analysis as detailed herein according to one or more embodiments of the invention. With reference to FIG. 1A, linguistic descriptions may include lexical descriptions 101, morphological descriptions 102, syntactic descriptions 103, and semantic descriptions 104. Each of these components of linguistic descriptions are shown influencing or serving as input to steps in the flow diagram 100. The method includes starting from a source sentence 105. The source sentence is analyzed 106 (as described more fully herein). Next, a language-independent semantic structure (LISS) is constructed 107. The LISS represents the meaning of the source sentence. Next, the source sentence, the syntactic structure of the source sentence and the LISS are indexed 108. The result is a set of collection of indexes or indices 109.

An index usually comprises a representation in the form of a table where each value of a feature (e.g., word, sentence) in a document is accompanied by a list of numbers or addresses of its occurrences in that document. For example, for each feature found in the text (e.g., word, character, expression, phrase), an index includes a list of sentences where it was found, and a number of the word corresponding to its place in the sentence. For instance, if the word "frame" was found in a text in the 1st sentence at the 4th place, and also in the 2nd sentence at the 2nd place, in the 10th—at the 4th and in 22nd sentences at the 5th place, its index may approximately looks like
"frame"—(1.4), (2.2), (10.4), (22.5).

If an index is created for a corpora, i.e., a set of texts, it may include a number corresponding to one of the texts that belong to the corpora. Similarly, indexes of other features may be made, e.g., semantic classes, semantemes, grammemes, syntactic relations, semantic relations etc. According to embodiments of the present invention, morphological, syntactic, lexical, and semantic features can be indexed in the same fashion as each word in a document. In one embodiment of the present invention, indexes may be produced to index all or at least one value of morphological, syntactic, lexical, and semantic features (parameters) for each sentence or other division. These parameters or values are generated during the two-stage semantic analysis described below. The index may be used to facilitate natural language processing.

In one implementation, said linguistic descriptions include a plurality of linguistic models and knowledge about natural languages. These things may be arranged in a database and applied for analyzing each text or source sentences such as at step 106. Such a plurality of linguistic models may include, but is not limited to, morphology models, syntax models, grammar models and lexical-semantic models. In a particular implementation, integral models for describing the syntax and semantics of a language are used in order to recognize the meanings of the source sentence, analyze complex language structures, and correctly convey information encoded in the source sentence.

Figure 2:
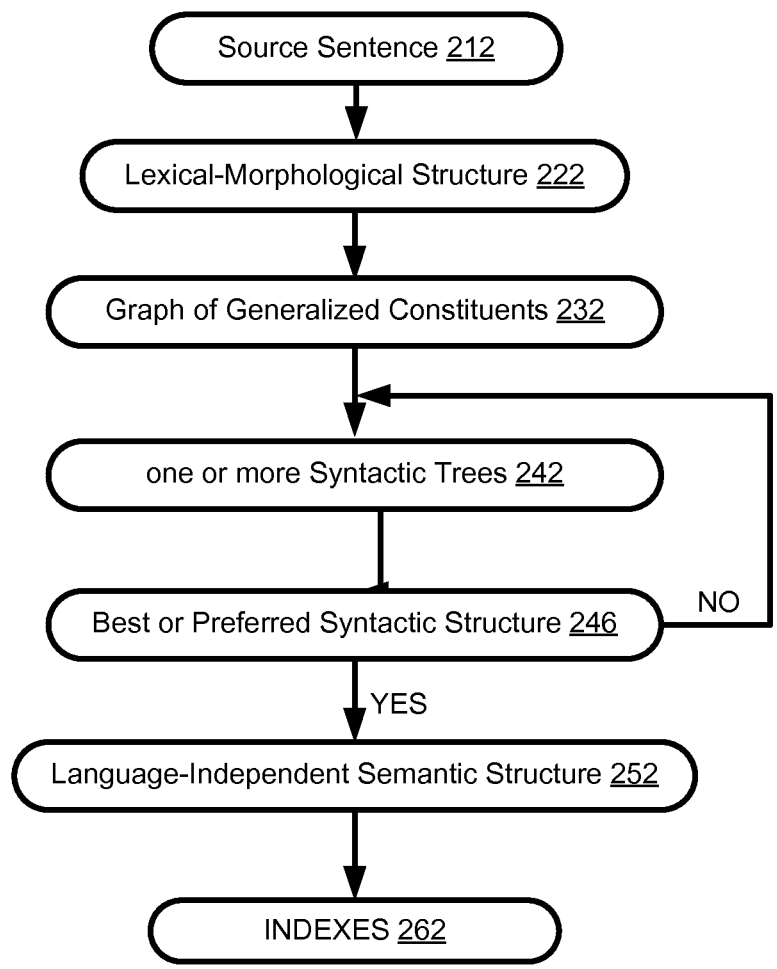
FIG. 2 shows a flow diagram of the method in details according to one or more embodiments of the invention in detail.

With reference to FIG. 1A and FIG. 2, when analyzing 106 the meaning of the source sentence 105, a lexical-morphological structure is found 222. Next, a syntactic analysis is performed and is realized in a two-step analysis algorithm (e.g., a "rough" syntactic analysis and a "precise" syntactic analysis) implemented to make use of linguistic models and knowledge at various levels, to calculate probability ratings and to generate the most probable syntactic structure, e.g., a best syntactic structure.

Figure 2A:
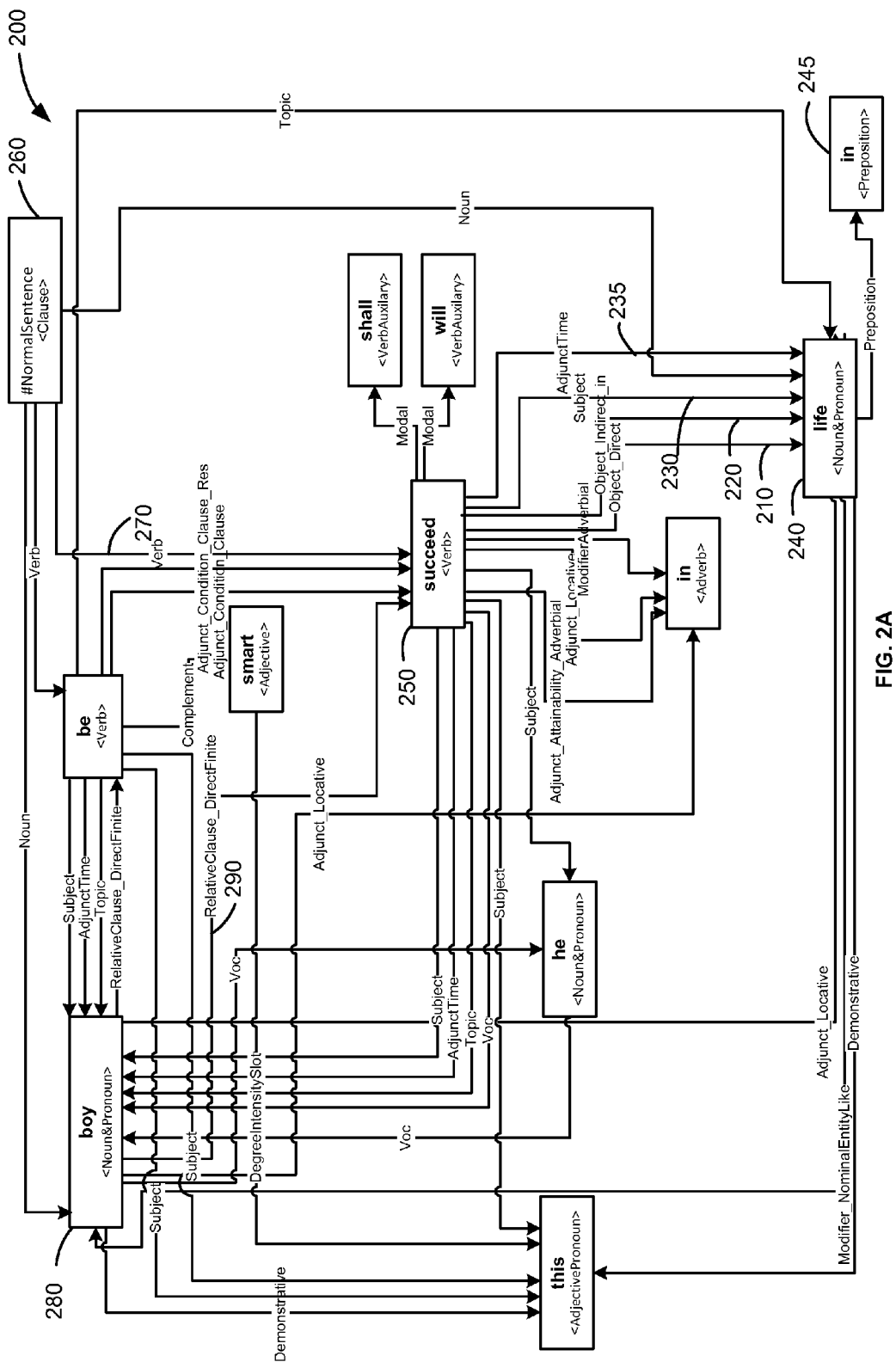
FIG. 2A illustrates a graph of generalized constituents of an exemplary sentence according to one exemplary embodiment of the invention.

Accordingly, a rough syntactic analysis is performed on the source sentence to generate a graph of generalized constituents 232 for further syntactic analysis. All reasonably possible surface syntactic models for each element of lexical-morphological structure are applied, and all the possible constituents are built and generalized to represent all the possible variants of parsing the sentence syntactically. FIG. 2A illustrates a graph of generalized constituents of an exemplary sentence, "This boy is smart, he'll succeed in life" according to one exemplary embodiment of the invention.

Following the rough syntactic analysis, a precise syntactic analysis is performed on the graph of generalized constituents to generate one or more syntactic trees 242 to represent the source sentence. In one implementation, generating the syntactic tree 242 comprises choosing between lexical options and choosing between relations from the graphs. Many prior and statistical ratings may be used during the process of choosing between lexical options, and in choosing between relations from the graph. The prior and statistical ratings may also be used for assessment of parts of the generated tree and for the whole tree. In one implementation, the one or more syntactic trees may be generated or arranged in order of decreasing assessment. Thus, the best syntactic tree may be generated first. Non-tree links are also checked and generated for each syntactic tree at this time. If the first generated syntactic tree fails, for example, because of an impossibility to establish non-tree links, the second syntactic tree is taken as the best, etc.

Many lexical, grammatical, syntactical, pragmatic, semantic features are extracted during the steps of analysis. For example, the system can extract and store lexical information and information about belonging lexical items to semantic classes, information about grammatical forms and linear order, about syntactic relations and surface slots, using predefined forms, aspects, sentiment features such as positive-negative relations, deep slots, non-tree links, semantemes, etc.

Figure 3:
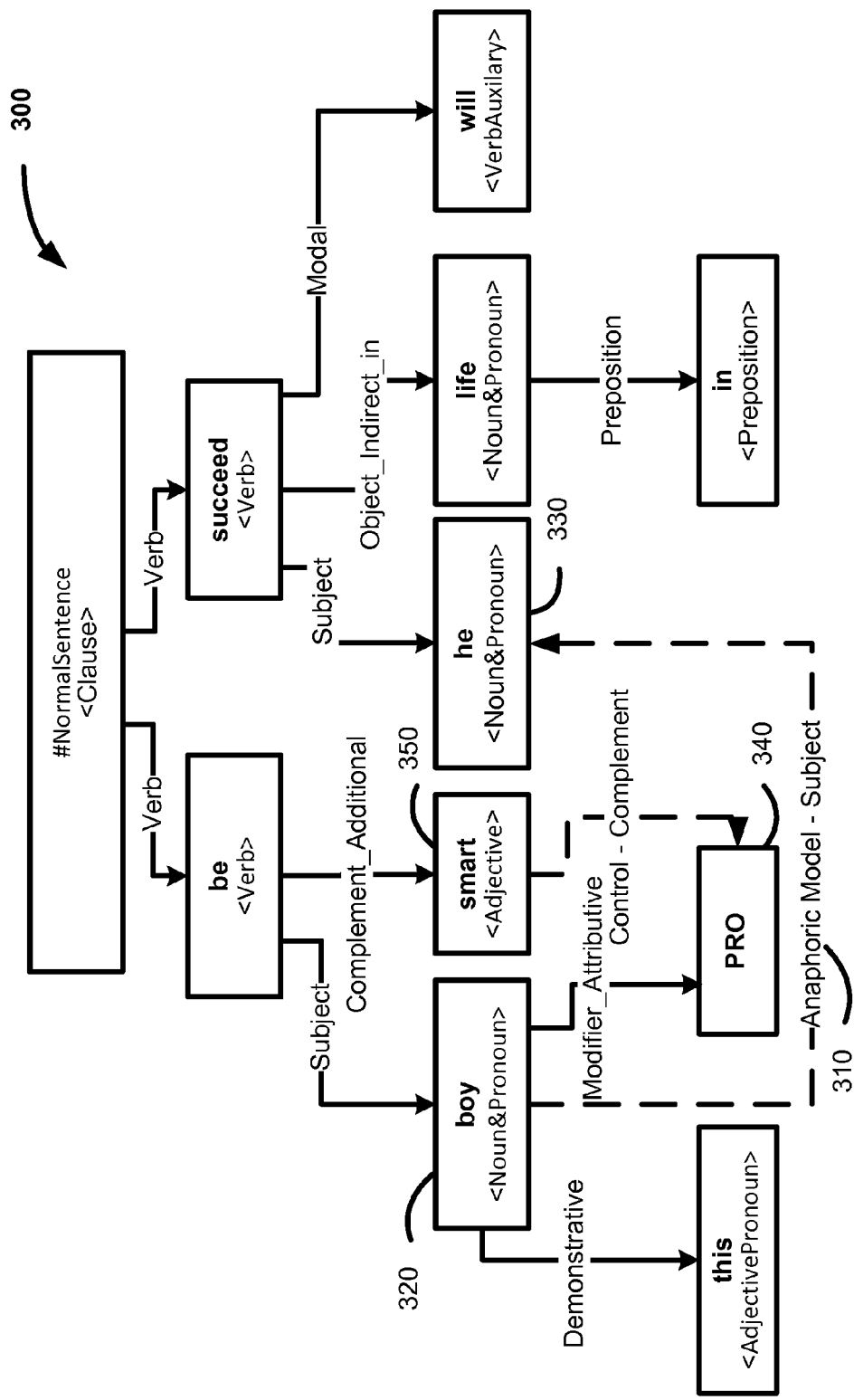
FIG. 3 shows an example of a syntactic tree, obtained as a result of a precise syntactic analysis of the sentence.

FIG. 3 shows an example of a syntactic tree 300, obtained as a result of a precise syntactic analysis of the sentence, "This boy is smart, he'll succeed in life." This tree contains complete or substantially complete syntactic information, such as lexical meanings, parts of speech, syntactic roles, grammatical values, syntactic relations (slots), syntactic models, non-tree link types, etc. For example, "he" is found to relate to "boy" as an anaphoric model subject 310. "Boy" is found as a subject 320 of the verb "be." "He" is found to be the subject 330 of "succeed." "Smart" is found to relate to "boy" through a "control-complement" 340. "Smart" is found to be an adjective 350.

With reference to FIG. 2, this two-step syntactic analysis approach ensures that the meaning of the source sentence is accurately represented by the best syntactic structure 246 chosen from the one or more syntactic trees. Advantageously, the two-step analysis approach follows a principle of integral and purpose-driven recognition, i.e., hypotheses about the structure of a part of a sentence are verified using all available linguistic descriptions within the hypotheses about the structure of the whole sentence. This approach avoids a need to analyze numerous parsing anomalies or variants known to be invalid. In some situations, this approach reduces the computational resources required to process the sentence.

With reference again to FIG. 1A, after the sentence has been analyzed, at step 107 the syntactic structure of the sentence is semantically interpreted, and a language-independent semantic structure is constructed to represent the meaning of the sentence. The language-independent semantic structure is a generalized data structure in a language-independent form or format. Such language-independent semantic structure or LISS is generated for each sentence to accurately describe the meaning of the sentence and to reflect all or substantially all grammatical, lexical and syntactic features in language-independent terms. The LISS is an effective means to compare disparate sources of information with one another.

Figure 4:
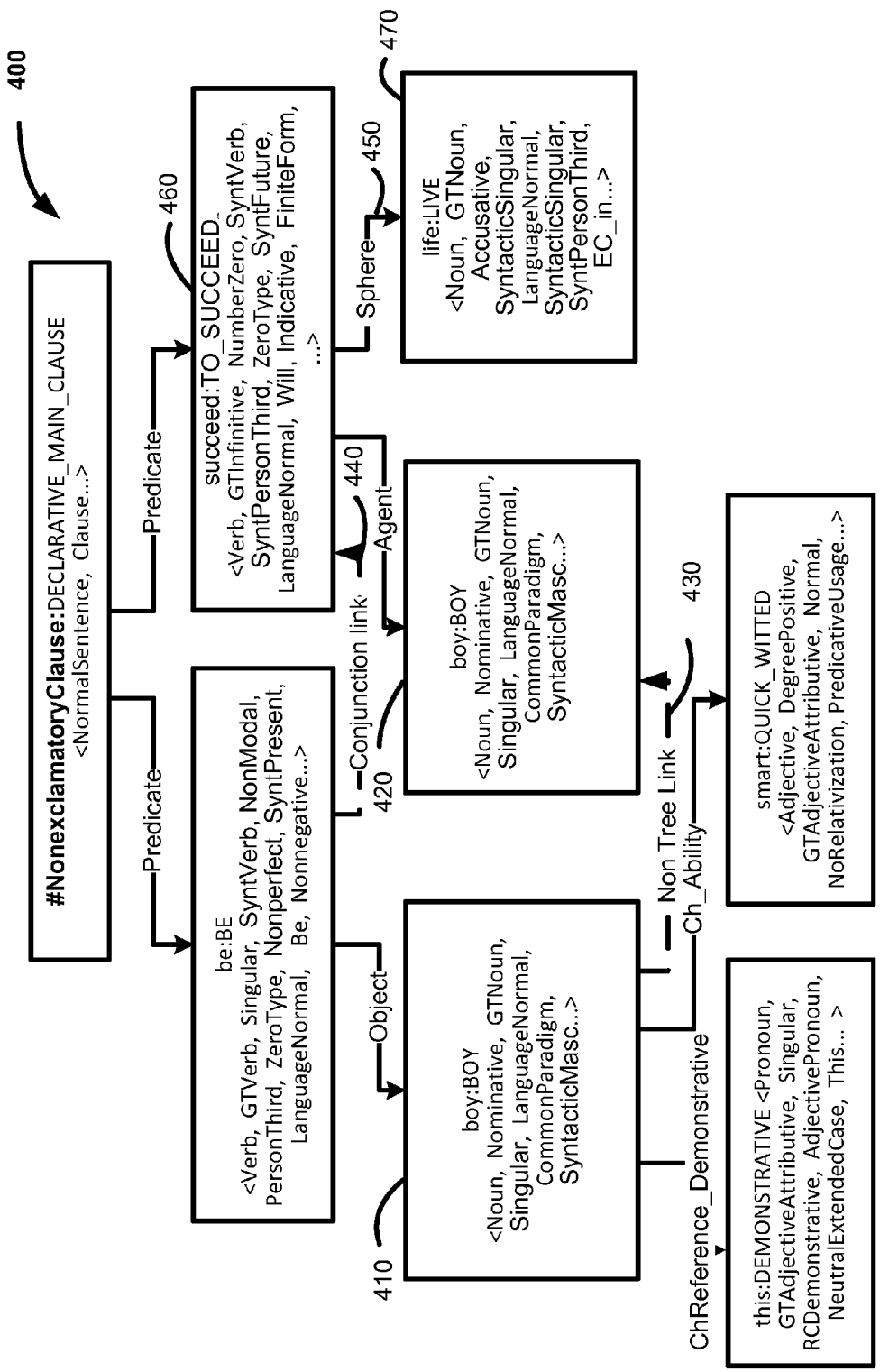
FIG. 4 shows an example of a semantic structure, obtained for the sentence.
Figure 5A:
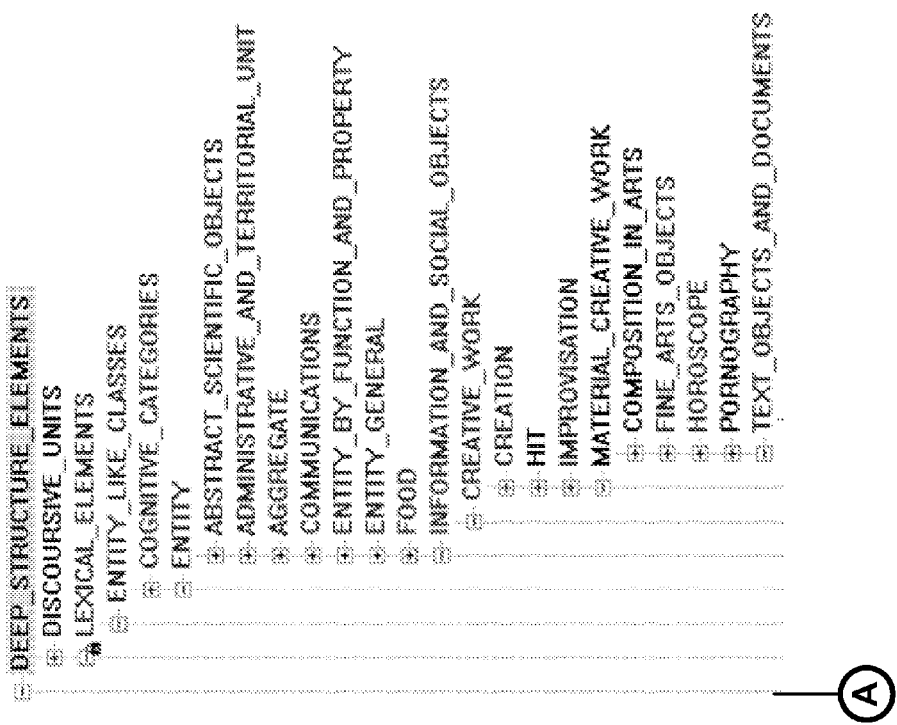
Figure 5B:
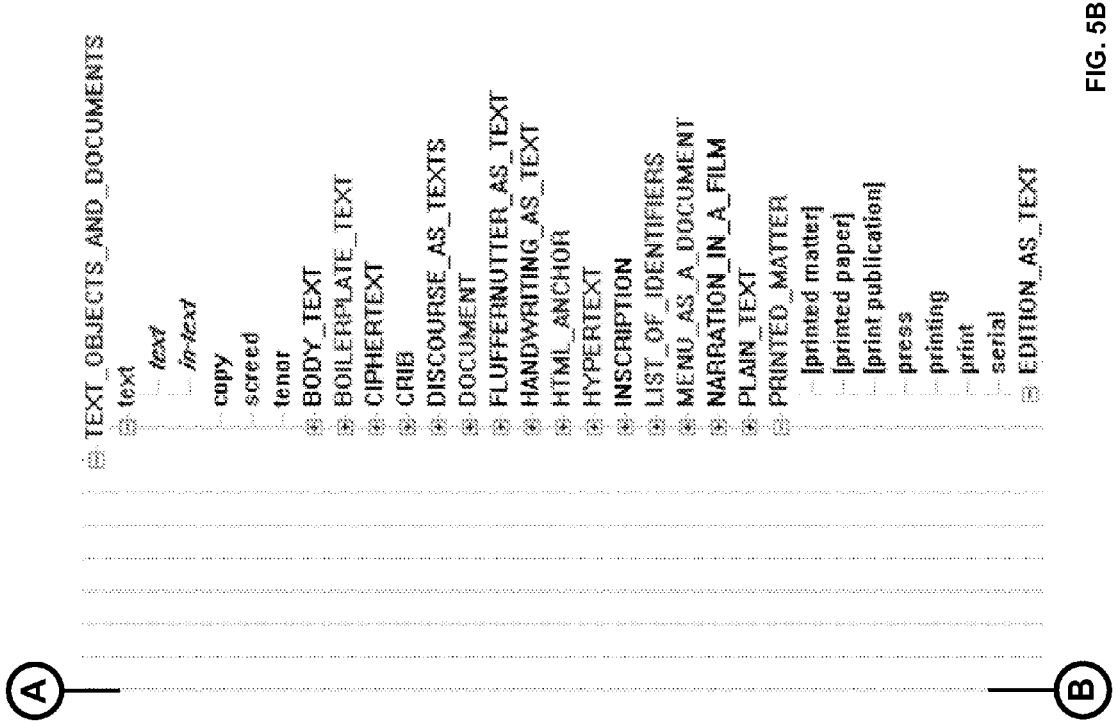
Figure 5C:
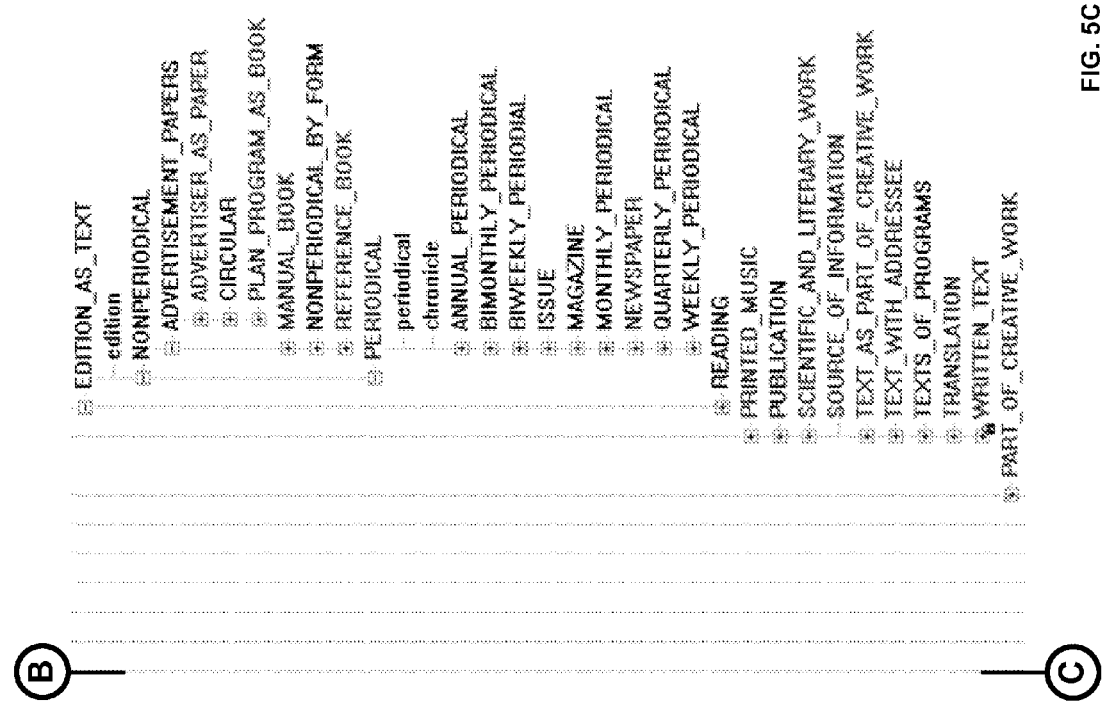

The analysis methods ensure that the maximum accuracy in conveying or understanding the meaning of the sentence is achieved. FIG. 4 shows an example of a semantic structure, obtained for the sentence "This boy is smart, he'll succeed in life." With reference to FIG. 4, this structure contains all syntactic and semantic information, such as semantic class, semantemes, semantic relations (deep slots), non-tree links, etc.

With reference to FIG. 4, the conjunction non-tree link 440 connects two parts of the complex sentence "This boy is smart, he'll succeed in life." Also, referential non-tree link 430 connects two constituents 410 and 420. This non-tree link reflects anaphoric relation between the words "boy" and "he" to identify the subjects of the two parts of the complex sentence. This relation (310) is also shown on a syntactic tree (FIG. 3) after a syntactic analysis and establishing non-tree links. Additionally, a proform PRO 340 is inserted to establish a link between the controller ("boy") 320 and the controlled element ("smart") 350. As a result, the complement "smart" 350 fills the surface slot "Modifier_Attributive" 360 of the controller "boy" 320 by means of a link of type "Control-Complement" 370.

Referring to FIG. 2, illustrated therein is a method to convert a source sentence 105 into a language independent semantic structure (LISS) 252 through the use of various structures according to an exemplary implementation of the invention and the linguistic descriptions employed. With reference to FIG. 2, a lexical-morphological structure 222 is found or created from a sentence (each sentence in a corpora or multi-sentence text). A graph of generalized constituents is created 232. Next, one or more syntactic trees are created 242. A best or preferred syntactic structure is selected 246. If a best one is not found, the method iterates until a best syntactic structure is identified (or until the possibilities have been exhausted). Indices of syntactic features may be generated after this step of selecting a best syntactic structure 246. Once a best syntactic structure is identified and selected 246, a language-independent semantic structure is created 252. After this step of generating a language-independent semantic structure or LISS, indices 262 of semantic features, and also, other (lexical, syntactical, morphological, pragmatic, etc.) features which had been recognized during all steps of analysis, may be generated.

The language-independent semantic structure of a sentence is represented as an acyclic graph (a tree supplemented with non-tree links) where each word of specific language is substituted with its universal (language-independent) semantic notions or semantic entities referred to herein as "semantic classes". Semantic class is one of the most important semantic features that can be extracted and used for tasks of classifying, clustering and filtering text documents written in one or many languages. The other features usable for such task may be semantemes because they may reflect not only semantic, but also syntactical, grammatical, etc. language-specific features in language-independent structures.

The semantic classes, as part of linguistic descriptions, are arranged into a semantic hierarchy comprising hierarchical parent-child relationships. In general, a child semantic class inherits many or most properties of its direct parent and all ancestral semantic classes. For example, semantic class SUBSTANCE is a child of semantic class ENTITY and at the same time it is a parent of semantic classes GAS, LIQUID, METAL, WOOD_MATERIAL, etc. FIG. 5A-5D illustrate fragments of said semantic hierarchy.

Each semantic class in the semantic hierarchy is supplied with a deep model. The deep model of the semantic class is a set of deep slots. Deep slots reflect the semantic roles of child constituents in various sentences with objects of the semantic class as the core of a parent constituent and the possible semantic classes as fillers of deep slots. The deep slots express semantic relationships between constituents, including, for example, "agent", "addressee", "instrument", "quantity", etc. A child semantic class inherits and adjusts the deep model of its direct parent semantic class.

Figure 6:
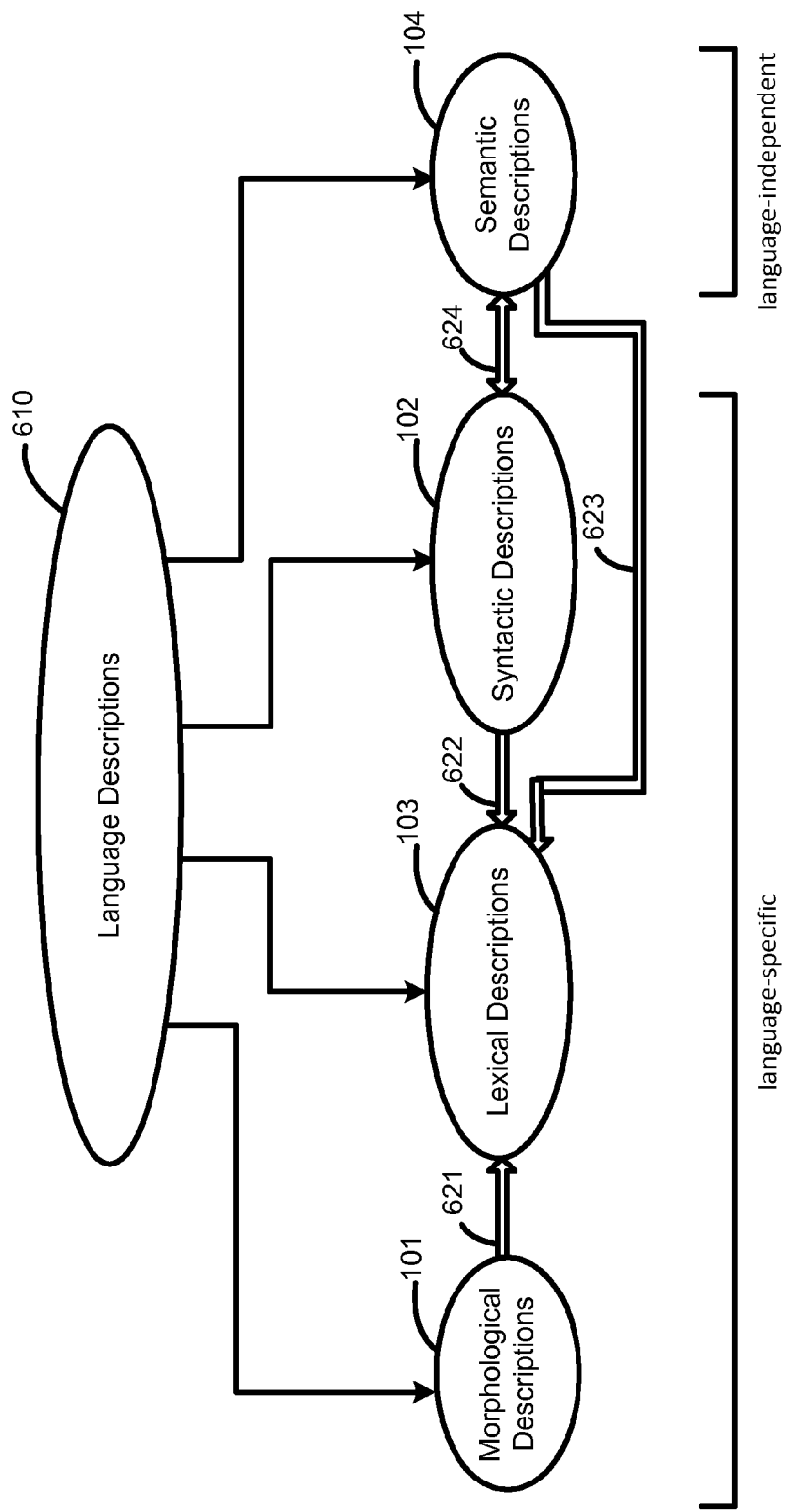
FIG. 6 is a diagram illustrating language descriptions according to one exemplary embodiment of the invention.
Figure 7:
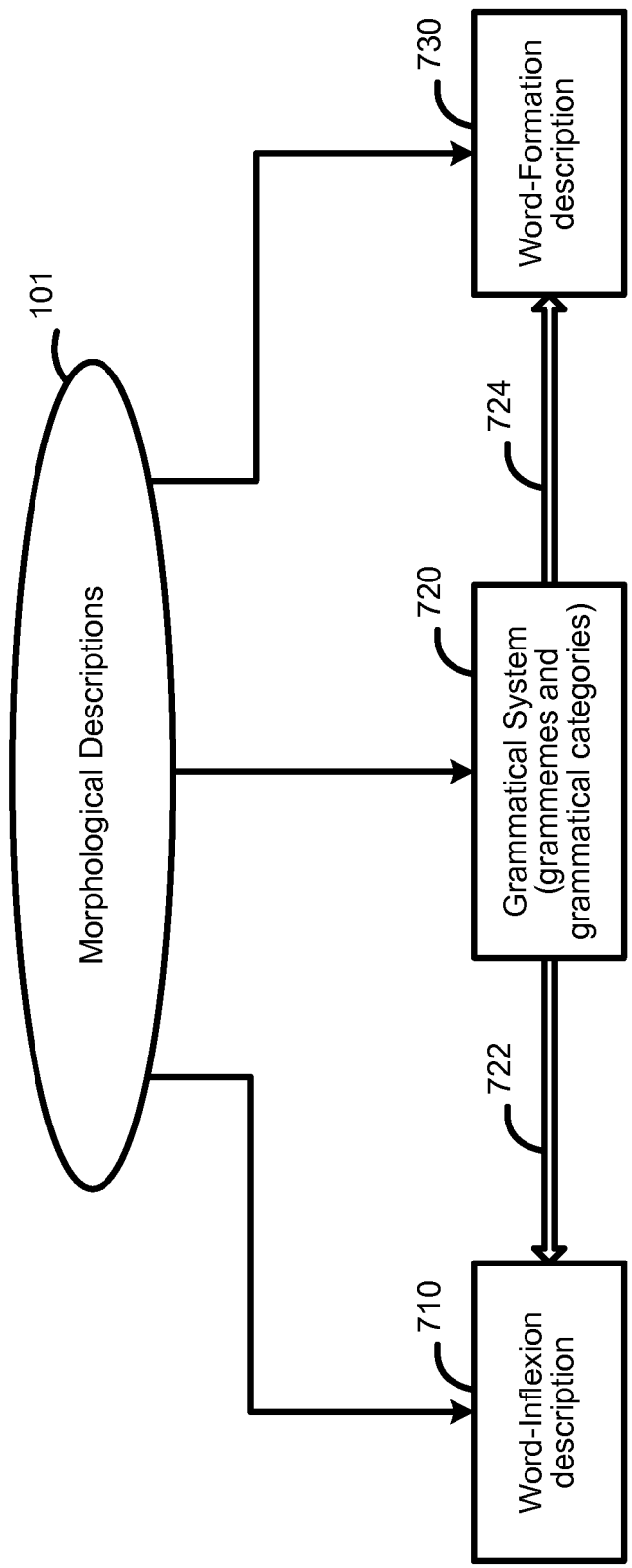
FIG. 7 is a diagram illustrating morphological descriptions according to one or more embodiments of the invention.
Figure 8:
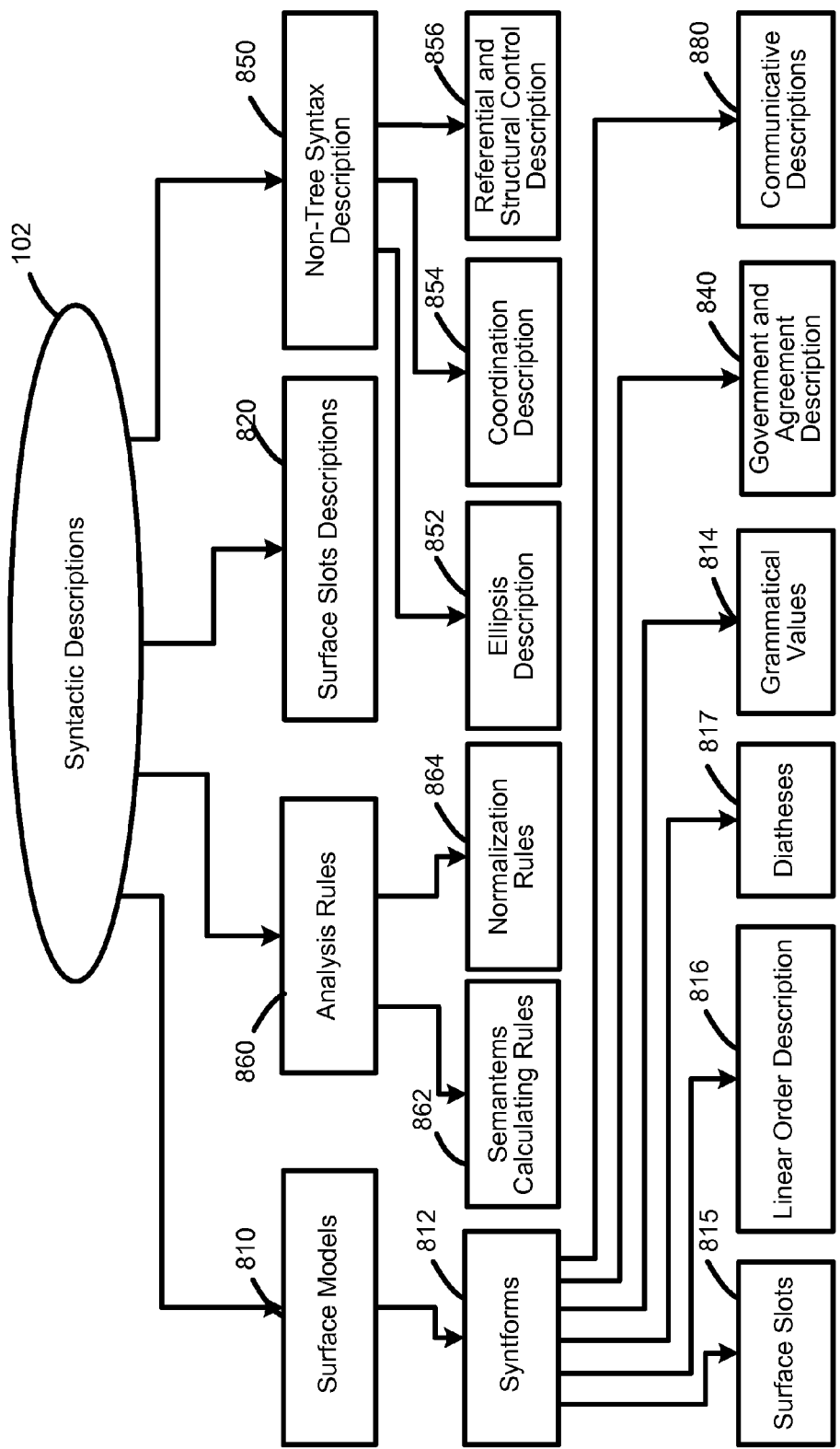
FIG. 8 is diagram illustrating syntactic descriptions according to one or more embodiments of the invention.
Figure 9:
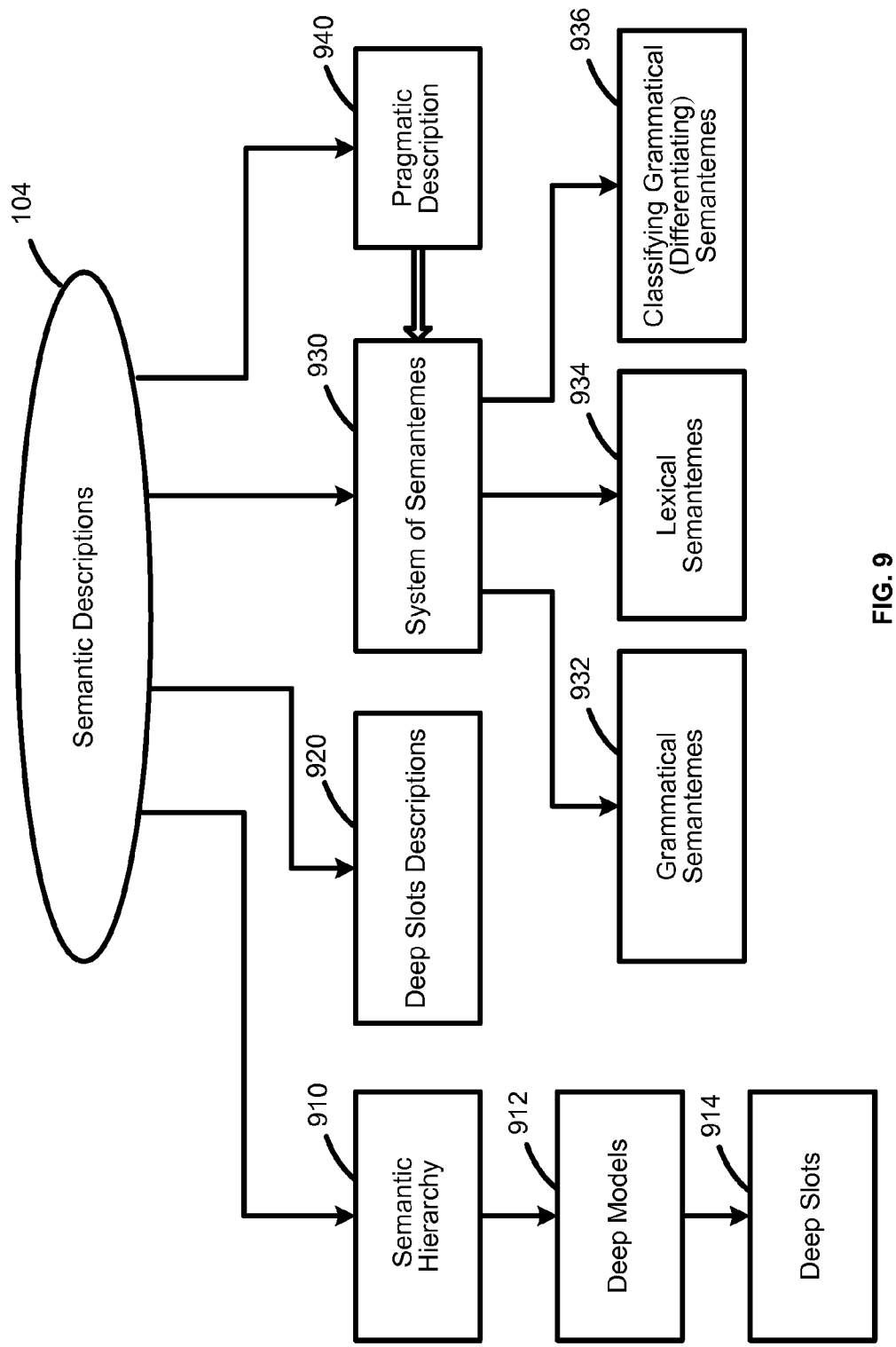
FIG. 9 is diagram illustrating semantic descriptions according to exemplary embodiment of the invention.

FIG. 6 is a diagram illustrating language descriptions 610 according to one exemplary implementation of the invention. With reference to FIG. 6, language descriptions 610 comprise morphological descriptions 101, syntactic descriptions 102, lexical descriptions, 103 and semantic descriptions 104. Language descriptions 610 are joined into one common concept. FIG. 7 is a diagram illustrating morphological descriptions according to one or more embodiments of the invention. FIG. 8 is diagram illustrating syntactic descriptions according to one or more embodiments of the invention. FIG. 9 is diagram illustrating semantic descriptions according to one or more embodiments of the invention.

With reference to FIG. 6 and FIG. 9, being a part of semantic descriptions 104, the semantic hierarchy 910 is a core feature of the language descriptions 610, which links together language-independent semantic descriptions 104 and language-specific, lexical descriptions 103 as shown by the double arrow 623, morphological descriptions 101, and syntactic descriptions 102 as shown by the double arrow 624. A semantic hierarchy may be created just once, and then may be filled for each specific language. Semantic class in a specific language includes lexical meanings with their models.

Semantic descriptions 104 are language-independent. Semantic descriptions 104 may provide descriptions of deep constituents, and may comprise a semantic hierarchy, deep slots descriptions, a system of semantemes, and pragmatic descriptions.

With reference to FIG. 6, the morphological descriptions 101, the lexical descriptions 103, the syntactic descriptions 102, and the semantic descriptions 104 may be related. A lexical meaning may have one or more surface (syntactic) models that may be provided by semantemes and pragmatic characteristics. The syntactic descriptions 102 and the semantic descriptions 104 are also related. For example, diatheses of the syntactic descriptions 102 can be considered as an "interface" between the language-specific surface models and language-independent deep models of the semantic description 104.

FIG. 7 illustrates exemplary morphological descriptions 101. As shown, the components of the morphological descriptions 101 include, but are not limited to, word-inflexion description 710, grammatical system (e.g., grammemes) 720, and word-formation description 730. In one embodiment, grammatical system 720 includes a set of grammatical categories, such as, "Part of speech", "Case", "Gender", "Number", "Person", "Reflexivity", "Tense", "Aspect", etc. and their meanings, hereafter referred to as "grammemes". For example, part of speech grammemes may include "Adjective", "Noun", "Verb", etc.; case grammemes may include "Nominative", "Accusative", "Genitive", etc.; and gender grammemes may include "Feminine", "Masculine", "Neuter", etc.

With reference to FIG. 7, a word-inflexion description 710 describes how the main form of a word may change according to its case, gender, number, tense, etc. and broadly includes all possible forms for a given word. Word-formation 730 describes which new words may be generated involving a given word. The grammemes are units of the grammatical systems 720 and, as shown by a link 722 and a link 724, the grammemes can be used to build the word-inflexion description 710 and the word-formation description 730.

FIG. 8 illustrates exemplary syntactic descriptions 102. With reference to FIG. 8, the components of the syntactic descriptions 102 may comprise surface models 810, surface slot descriptions 820, referential and structural control descriptions 856, government and agreement descriptions 840, non-tree syntax descriptions 850, and analysis rules 860. The syntactic descriptions 302 are used to construct possible syntactic structures of a sentence from a given source language, taking into account free linear word order, non-tree syntactic phenomena (e.g., coordination, ellipsis, etc.), referential relationships, and other considerations.

Figure 10:
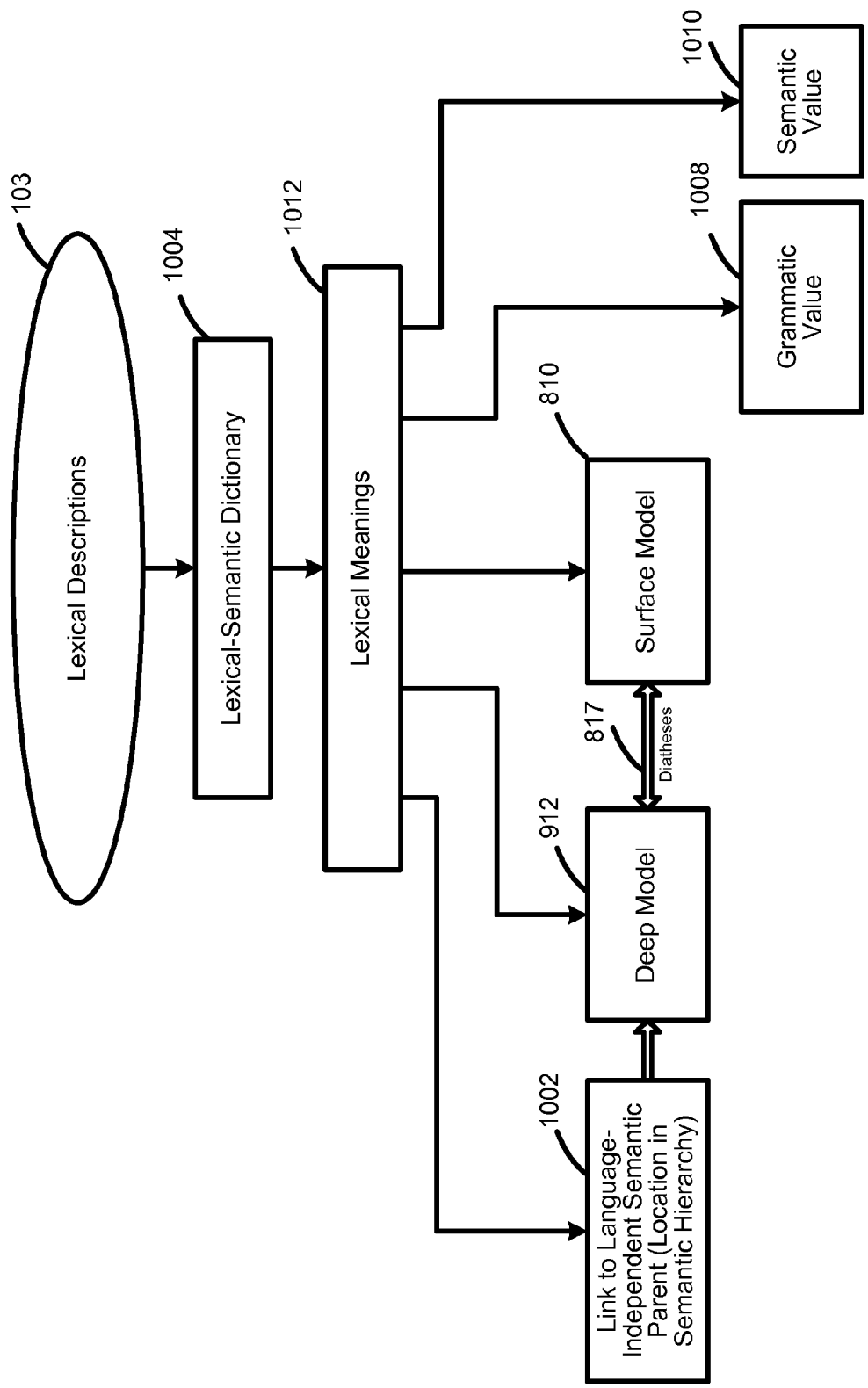
FIG. 10 is a diagram illustrating lexical descriptions according to one or more embodiments of the invention.

FIG. 10 is a diagram illustrating lexical descriptions 103 according to one exemplary implementation of the technology. The lexical descriptions 103 include a lexical-semantic dictionary 1004 that includes a set of lexical meanings 1012 arranged with their semantic classes into a semantic hierarchy, where each lexical meaning may include, but is not limited to, its deep model 912, surface model 810, grammatical value 1008 and semantic value 1010. A lexical meaning may unite different derivates (words) which express the meaning via different parts of speech or different word forms, such as words having the same root. In turn, a semantic class unites lexical meanings of one or more different languages with very close semantics.

Also, any element of language description 610 may be extracted during a substantially exhaustive analysis of texts, may be indexed (the index for the feature are created), the indices may be stored and used for the task of classifying, clustering and filtering text documents written in one or many languages. In one implementation, indexing of semantic classes is most significant and helpful for solving these tasks. Syntactic structures and semantic structures also may be indexed and stored for using in semantic searching, classifying, clustering and filtering.

One simple way to estimate similarity between two texts in the same language is to compare their indexes. It may be indexes of words, or indexes of semantic classes. The indexes may be presented by simple data structures, for example, arrays of numbers. If indexes of words for texts are identical, then the texts are identical, or may be considered identical for a particular purpose. If indexes of semantic classes for two texts are identical, then the texts are identical or substantially similar. This approach of using indexes of semantic classes, with some limitations, also may be applied to estimating similarity of texts in different languages. A word order in corresponding sentences in different languages may be different, so when estimating a measure of similarity between two sentences, it is acceptable to ignore the number of a word in the sentence corresponding to its placement or word order.

Another problem is that the most frequent words in a language, such as "the", "not", "and" etc. usually are not indexed, so the two sentences, "The approval of the CEO is required" and "The approval of the CEO isn't required" will have the same indexes, and these two sentences will be identified as the same by conventional methods. The methods of the present invention identify the sentences as different because they also take into account specific lexical, syntactical and semantic features extracted during steps of the analysis. The fact that the verb "require" is presented in negative form in one of the sentences is fixed by means of semantemes.

But, a problem arises if, for example, in some cases, one sentence in a language corresponds two or more sentences in another language and vice versa. In this case, to increase the accuracy of the present methods, the techniques of aligning (for example, presented in U.S. application Ser. No. 13/464, 447) of two or more texts may be applied before indexing. There are many ways to calculate similarity between two texts. One naïve way to find out if two texts are similar is to count how many words they have in common. There are also more advanced versions of this approach such as techniques involving lemmatization, stemming, weighting, etc. For example, a vector space model (G. Salton, 1975) may be built, and vector similarity measures, such as e.g. cosine similarity, may be utilized. During the text processing described here, documents may be represented with language independent semantic classes that in their turn may be considered as lexical features. Therefore, the similarity measures as were mentioned above may be.

Such similarity measures have a drawback in that they do not actually capture the semantics. For example, the two sentences, "Bob has a spaniel" and "Richard owns a dog" are semantically similar but they do not share any words but an article. Therefore, a mere lexical text similarity measure will fail to find that these sentences are similar. To capture this type of similarity, knowledge-based semantic similarity measures may be used. They require a semantic hierarchy to be calculated. Similarity between two words usually depends on a shortest path between corresponding concepts in a corresponding semantic hierarchy. For example, "spaniel" in the semantic hierarchy corresponding to the first sentence above appears as a child node (hyponym) of "dog", therefore semantic similarity between the concepts will be high. Word-to-word similarity measures may be generalized to text-to-text similarities by combining values for similarities of each word pair. Semantic classes described here represent nodes of semantic hierarchy. Therefore, knowledge-based semantic similarity measures described above and their generalizations to text-to-text similarity measures may be utilized within document processing.

For example, referring to the present invention, textual information may be represented as a list of features, which may include semantic classes $\{C_1, C_2, \ldots C_m\}$, semantic features $\{M_1, M_2, \ldots M_n\}$, and syntactic features $\{S_1, S_2, \ldots S_k\}$. Since lexical meanings may be expressed in different words, and semantic class may unite several close lexical meanings, the semantic class embodies the idea of generalization. Synonyms and derivates are generalized. If we deal with texts in different languages, semantic class generalizes lexical meanings in the different languages. Semantic features reflect semantic structure of a text. This may contain e.g. semantic roles of elements, such as agent, experiencer etc. Syntactic features reflect syntactic structure of a text, for example, may be produced by constituency or dependency parsers.

In the present invention semantic classes are organized into the semantic hierarchy, which is in general a graph. Therefore, in one embodiment, the distance between two nodes can be defined as the shortest path between these nodes in the graph. And similarity between semantic classes can be a function of the mentioned distance between them.

In another embodiment, the similarity measure for two or more documents may be defined heuristically or on the basis of experience. For example, we have 2 text documents—D1 and D2. After semantic analysis we have two sets of semantic classes $C(D1)=\{C_{11}, C_{12}, \ldots C_{1n}\}$ and $C(D2)=\{C_{21}, C_{22}, \ldots C_{2m}\}$. Each class may be supplied by coefficient of the frequency $F_{ij}$ in the document. Most frequent in a language semantic classes may be excluded. Most common semantic classes (like ENTITY, ABSRACT_SCIENTIFIC_OBJECT, etc.) also may be discarded. Then a similarity or difference measure depends on distances between each pair of semantic classes ($C_1$, $C_2$), where $C_1 \in C(D1)$ and $C_2 \in C(D2)$. In one embodiment, the similarity or difference measure between semantic classes may be defined as e.g. a function of path between semantic classes, i.e., $sim(C_1, C_2) = f(path(C_1, C_2))$, $dif(C_1, C_2) = g(path(C_1, C_2))$, e.g. identity function. In another embodiment, the similarity measure or the difference measure is based on the idea of the closest common ancestor of the classes: $anc(C_1, C_2)$ In one embodiment, the similarity between texts may be defined as follows:

$$sim(D1, D2) = g\left(\frac{\sum_{C1 \in C(D1), C2 \in C(D2)} sim(C1, C2)}{|C(D1)| \cdot |C(D2)|}\right)$$

where $|C(D)|$ denotes the number of semantic classes in C(D), and g is some function.

In one embodiment, the difference between texts may be defined as follows:

$$dif(D1, D2) = g\left(\frac{\sum_{C1 \in C(D1), C2 \in C(D2)} dif(C1, C2)}{|C(D1)| \cdot |C(D2)|}\right)$$

Figure 11:
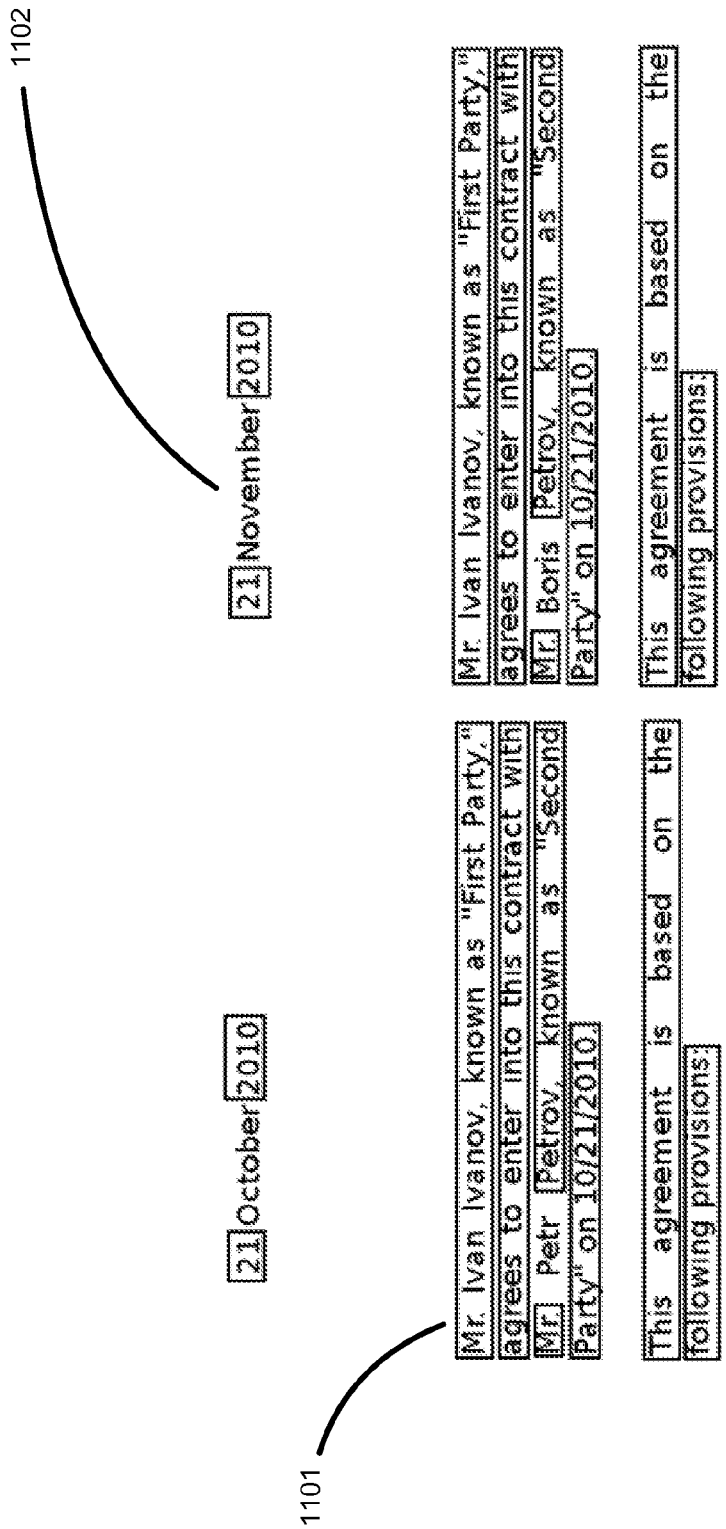
FIG. 11 is an example of a visualization of a result of comparing two documents.

This method may be used to provide visualizations for similarities or differences between documents. This may be done with e.g., highlighting, underlining, and emphasizing similar parts or different parts while showing or displaying one or more of the documents or parts thereof. FIG. 11 shows an example of a possible visualization of similarity estimation where identical parts of documents 1101 are stressed (in frames) and differences 1102 are not so shown (shown in FIG. 11 as ordinary text). Another exemplary visualization is to change the color, size, font, etc. of the words that are either the same or different from those of another document. While the form of displaying differences or similarities may be varied, embodiments as described herein include showing differences or similarities for the benefit of a viewer or user.

Figure 11A:
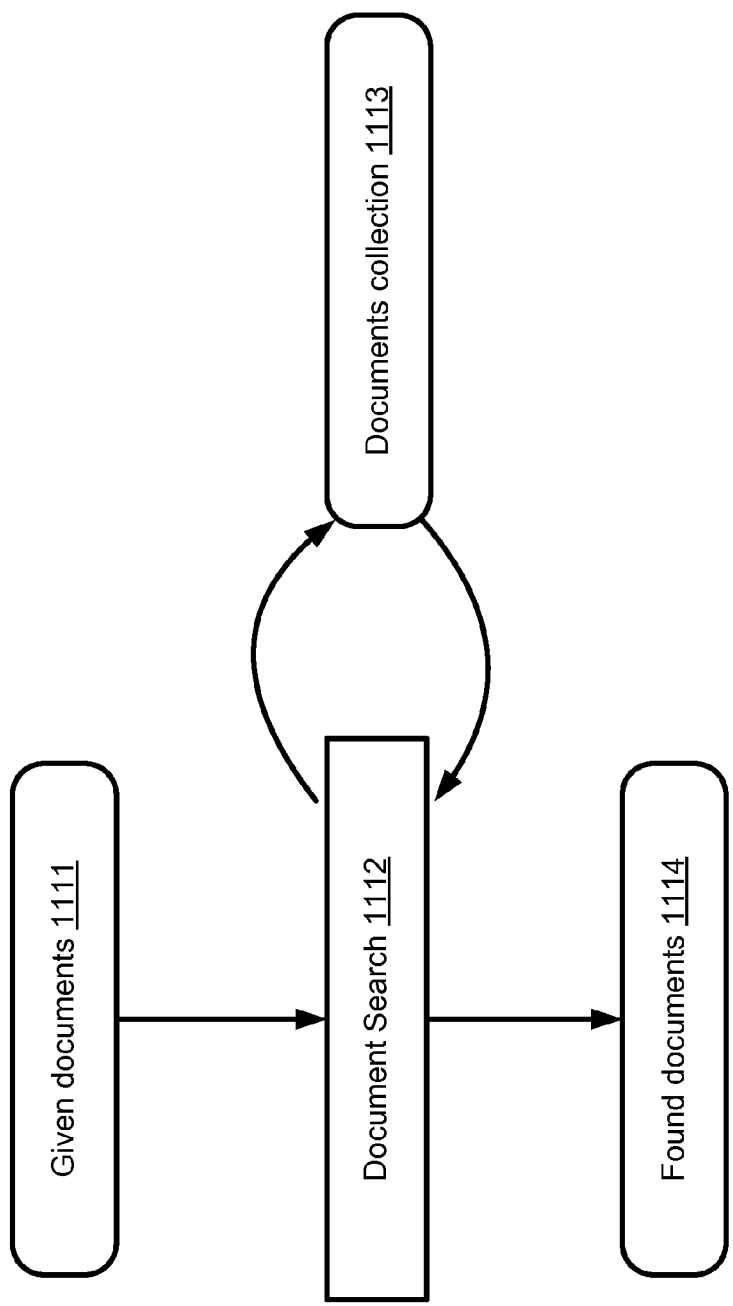
FIG. 11A shows a flow diagram of a method of finding similar/different documents within a collection of documents, according to one embodiment of the invention.

FIG. 11A shows a flow diagram of a method of finding similar documents within a collection of documents, according to one embodiment of the invention. In one embodiment, the disclosed notion of similarity is applied to analyze various collections of documents including linguistic corpora. With reference to FIG. 11A, given one or many documents 1111, similar documents 1114 can be found within a collection of documents 1113 (e.g., corpora) or across a corpora and across a second corpora (e.g., a portion of an Internet search, results of an Internet search). A document search 1112 may include: document preprocessing (which optionally includes determining information types); document logical structures; block structures; performing a semantic analysis; computing lexical, semantic, syntactic and other features; constructing language independent semantic structures; comparing documents; and estimating similarity between documents. In one embodiment, in order to make the search faster, some document pairs may be considered different after performing a preliminary comparison, e.g., comparison of document headers or a certain or predetermined number of blocks. Thus, further analysis and comparison of such document pairs is avoided and thereby reducing the computational requirement for processing such document pairs. In another embodiment, a document structure is presented as a tree, and the analysis can be done by only taking into account one or more high levels of the hierarchy.

Figure 12:
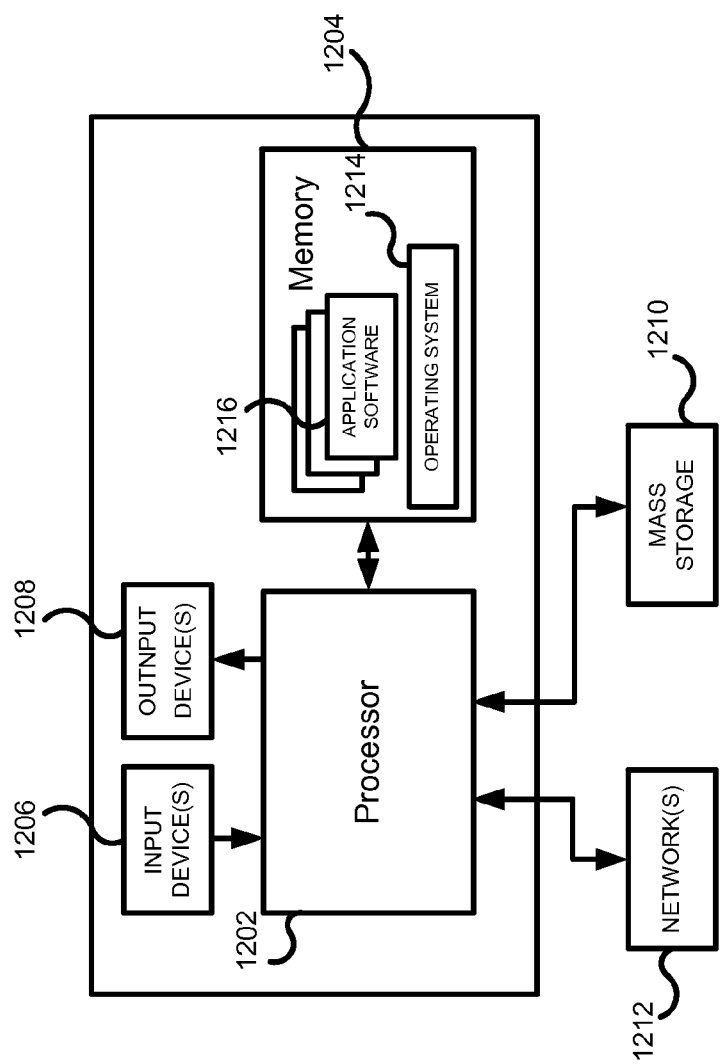
FIG. 12 shows an exemplary hardware for implementing a computer system in accordance with one embodiment of the invention.

FIG. 12 shows exemplary hardware for implementing the techniques and systems described herein, in accordance with one implementation of the present disclosure. Referring to FIG. 12, the exemplary hardware 1200 includes at least one processor 1202 coupled to a memory 1204. The processor 1202 may represent one or more processors (e.g. microprocessors), and the memory 1204 may represent random access memory (RAM) devices comprising a main storage of the hardware 1200, as well as any supplemental levels of memory, e.g., cache memories, non-volatile or back-up memories (e.g. programmable or flash memories), read-only memories, etc. In addition, the memory 1204 may be considered to include memory storage physically located elsewhere in the hardware 1200, e.g. any cache memory in the processor 1202 as well as any storage capacity used as a virtual memory, e.g., as stored on a mass storage device 1210.

The hardware 1200 also typically receives a number of inputs and outputs for communicating information externally. For interface with a user or operator, the hardware 1200 may include one or more user input devices 1206 (e.g., a keyboard, a mouse, imaging device, scanner, microphone) and a one or more output devices 1208 (e.g., a Liquid Crystal Display (LCD) panel, a sound playback device (speaker)). To embody the present invention, the hardware 1200 typically includes at least one screen device.

For additional storage, the hardware 1200 may also include one or more mass storage devices 1210, e.g., a floppy or other removable disk drive, a hard disk drive, a Direct Access Storage Device (DASD), an optical drive (e.g. a Compact Disk (CD) drive, a Digital Versatile Disk (DVD) drive) and/or a tape drive, among others. Furthermore, the hardware 1200 may include an interface with one or more networks 1212 (e.g., a local area network (LAN), a wide area network (WAN), a wireless network, and/or the Internet among others) to permit the communication of information with other computers coupled to the networks. It should be appreciated that the hardware 1200 typically includes suitable analog and/or digital interfaces between the processor 1202 and each of the components 1204, 1206, 1208, and 1212 as is well known in the art.

The hardware 1200 operates under the control of an operating system 1214, and executes various computer software applications, components, programs, objects, modules, etc. to implement the techniques described above. Moreover, various applications, components, programs, objects, etc., collectively indicated by application software 1216 in FIG. 12, may also execute on one or more processors in another computer coupled to the hardware 1200 via a network 1212, e.g. in a distributed computing environment, whereby the processing required to implement the functions of a computer program may be allocated to multiple computers over a network.

In general, the routines executed to implement the embodiments of the invention may be implemented as part of an operating system or a specific application, component, program, object, module or sequence of instructions referred to as a "computer program." A computer program typically comprises one or more instruction sets at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally to actually effect the distribution regardless of the particular type of computer-readable media used. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash memory, etc.), among others. Another type of distribution may be implemented as Internet downloads.

While certain exemplary embodiments have been described and shown in the accompanying drawings, it is to be understood that such embodiments are merely illustrative and not restrictive of the broad invention and that this invention is not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modified or re-arranged in one or more of its details as facilitated by enabling technological advancements without departing from the principals of the present disclosure.

We claim:

1. A method for comparing documents, the method comprising:
    associating, by a processor, a respective weight with each of a plurality of information types including text-based information, graphical information, audio information, or video information;
    identifying for each of the documents, by the processor, one or more segments each corresponding to one of the plurality of information types; and
    estimating, by the processor, a difference value between a first document of the documents and a second document of the documents by comparing each segment of the first document with a segment of the second document that corresponds to a same information type and combining results of the comparison based on the respective associated weights.

2. The method of claim 1, wherein the method further comprises:
    identifying a set of source sentences in each of the documents; and
    constructing a language-independent semantic structure (LISS) for each source sentence of the identified set of source sentences, wherein said estimating the difference value between the first and the second documents includes a comparison of the LISS's of the first document with the LISS's of the second document.

3. The method of claim 1, wherein the method further comprises:
    performing optical character recognition (OCR) on the one or more segments that include text in the form of graphical information.

4. The method of claim 2, wherein the method further comprises:
    displaying through a user interface a portion of the first document and a portion of the second document;
    identifying fragments of the first and the second documents that are related to said difference value; and
    aligning in the user interface the identified fragments with respect to each other and with respect to the user interface.

5. The method of claim 4, wherein the method further comprises:
    aligning identified fragments of the first document and the second document based on a comparison of the LISS's of sentences of the identified fragments of the first and the second documents.

6. The method of claim 1, wherein the method further comprises:
    displaying the estimated difference value through a user interface.

7. The method of claim 6 wherein said displaying the difference value includes:
    identifying, through the user interface, the first document and the second document if their difference value exceeds a difference threshold value; or
    identifying, through the user interface, the first document and the second document if their difference value fails to exceed the difference threshold value.

8. The method of claim 6, wherein said displaying the estimated difference value between the first and second documents includes:
    highlighting, underlying, or changing a font of respective pairs of similar portions of text-based information in the first and the second documents, wherein each of the respective pair of similar portions of text-based information includes a portion in the first document and a portion in the second document that are associated with a respective difference value that exceeds a difference threshold value or fails to exceed the difference threshold value.

9. The method of claim 2, wherein the method further comprises generating semantic class tokens of the sets of sources sentences, and wherein the difference value is based on comparing the semantic classes of tokens of the set of source sentences of the first document with the semantic class tokens of the set of source sentences of the second documents.

10. The method of claim 2, wherein the method further comprises:
    indexing each source sentence of said set of source sentences.

11. The method of claim 2, wherein the method further comprises:
    indexing the LISS's for each of said set of source sentences.

12. The method of claim 10, wherein said estimating a difference value between the first and second documents is based on comparing the indexes of fragments of text-based information.

13. The method of claim 2, wherein the set of source sentences of the first document are in a different language than the set of source sentences of the second document.

14. The method of claim 2, wherein the method further comprises:
    indexing semantic classes of said set of source sentences, and wherein said estimating the difference value is based on comparing the indexes of semantic classes of said set of source sentences.

15. The method of claim 11, wherein said estimating the difference value is based on comparing indexes of the language-independent semantic structures (LISS's) of the sets of source sentences.

16. The method of claim 15, wherein the indexes of the language-independent semantic structures (LISS's) of the set of source sentences include indexes of lexical features.

17. The method of claim 15, wherein the indexes of the language-independent semantic structures (LISS's) of the set of source sentences include indexes of grammatical features.

18. The method of claim 15, wherein the indexes of the language-independent semantic structures (LISS's) of the set of source sentences includes indexes of syntactical features.

19. The method of claim 15, wherein the indexes of the language-independent semantic structures (LISS's) of the set of source sentences includes indexes of semantic features.

20. The method of claim 3, wherein the method further comprises:
   converting each of the segments that correspond to non-text-based information to one or more text-based source sentences thereby creating a text-based equivalent block for each of the segments that correspond to non-text-based information;
   identifying source sentences in each of the segments that correspond to text-based information; and
   generating for each text-based segment or text-based equivalent block a language-independent semantic structure (LISS) of said source sentences.

21. The method of claim 1, wherein the method further comprises:
   determining a logical structure of each of the documents, and wherein said estimating the difference value is further based on said logical structures.

22. The method of claim 1, wherein the method further comprises:
   identifying fragments in the first document and the second document, wherein symbols in the fragments from the first document and symbols in the fragment from the second document are written in different alphabets.

23. The method of claim 1, wherein the method further comprises:
   identifying fragments in the first document, wherein a color of symbols in the fragments from the first document is substantially similar to a color of a background of the first document.

24. An electronic device for comparing documents, the electronic device comprising:
   a processor;
   a display in electronic communication with the processor; and
   a memory in electronic communication with the processor and the display, the memory configured with instructions to perform a method by the processor, the method including:
      associating a respective weight with each of a plurality of information types including text-based information, graphical information, audio information, or video information;
      identifying for each of the documents one or more segments each corresponding to one of the plurality of information types; and
      estimating a difference value between a first document of the documents and a second document of the documents by comparing each segment of the first document with a segment of the second document that correspond to a same information type and combining results of the comparison based on the respective associated weights.

25. The electronic device of claim 24, wherein the method further comprises:
   identifying a set of source sentences in each of the documents; and
   constructing a language-independent semantic structure (LISS) for each source sentence of the identified set of source sentences, wherein said estimating the difference value between the first and second documents includes a comparison of the LISS's of the first document with the LISS's of the second document.

26. The electronic device of claim 24, wherein the method further comprises:
   performing optical character recognition (OCR) on the one or more segments that include text in the form of graphical information.

27. The electronic device of claim 25, wherein the method further comprises:
   displaying through a user interface a portion of the first document and a portion of the second document;
   identifying fragments of the first and the second documents that are related to said difference value; and
   aligning in the user interface the identified fragments with respect to each other and with respect to the user interface.

* * * * *